United States Patent
Jabri et al.

(10) Patent No.: US 8,838,824 B2
(45) Date of Patent: Sep. 16, 2014

(54) METHOD AND APPARATUS FOR DELIVERY OF ADAPTED MEDIA

(75) Inventors: Marwan Jabri, Tiburon, CA (US); David Jack, Fairford (GB); Wei Zhou, Novato, CA (US); Brody Kenrick, San Francisco, CA (US); Kshitij Gupta, Uttar Pradesh (IN)

(73) Assignee: Onmobile Global Limited, Bangalore (IN)

( * ) Notice: Subject to any disclaimer, the term of this patent is extended or adjusted under 35 U.S.C. 154(b) by 349 days.

(21) Appl. No.: 12/661,468

(22) Filed: Mar. 16, 2010

(65) Prior Publication Data

US 2010/0268836 A1 Oct. 21, 2010

Related U.S. Application Data

(60) Provisional application No. 61/266,595, filed on Dec. 4, 2009, provisional application No. 61/160,576, filed on Mar. 16, 2009.

(51) Int. Cl.
*G06F 15/16* (2006.01)
*G06F 15/173* (2006.01)
*H04L 12/811* (2013.01)
*H04L 29/06* (2006.01)
*H04W 28/06* (2009.01)

(52) U.S. Cl.
CPC .............. *H04L 47/38* (2013.01); *H04W 28/06* (2013.01); *H04L 65/605* (2013.01)
USPC ............ 709/231; 709/203; 709/226; 709/241

(58) Field of Classification Search
USPC ......................................................... 709/231
See application file for complete search history.

(56) References Cited

U.S. PATENT DOCUMENTS

| 5,999,525 | A | 12/1999 | Krishnaswamy et al. |
| 6,778,525 | B1 * | 8/2004 | Baum et al. ................... 370/351 |
| 6,829,579 | B2 | 12/2004 | Jabri et al. |
| 7,058,721 | B1 * | 6/2006 | Ellison et al. ................. 709/231 |
| 7,073,011 | B2 * | 7/2006 | Lisitsa et al. ................. 710/316 |
| 7,133,521 | B2 | 11/2006 | Jabri et al. |
| 7,145,898 | B1 | 12/2006 | Elliott |
| 7,263,481 | B2 | 8/2007 | Jabri et al. |

(Continued)

FOREIGN PATENT DOCUMENTS

JP 02003801 A * 1/1990
WO WO 2008/098249 A1 8/2008

OTHER PUBLICATIONS

Zambelli, Alex. "IIS Smooth Streaming Technical Overview," Mar. 2009.*

(Continued)

*Primary Examiner* — Melvin H Pollack
(74) *Attorney, Agent, or Firm* — Hoffmann & Baron, LLP

(57) ABSTRACT

A method of transmitting media to a client by an infrastructure device in a packet-switched network includes receiving a media stream at the infrastructure device. The method also includes determining an adaptation strategy according to at least one of one or more pieces of network information associated with the packet-switched network, one or more pieces of client information associated with the client, or one or more policies. The method further includes adapting the media stream according to the adaptation strategy to produce an output media stream.

20 Claims, 13 Drawing Sheets

(56) References Cited

U.S. PATENT DOCUMENTS

| | | | |
|---|---|---|---|
| 7,359,344 B1* | 4/2008 | Cheng et al. | 370/321 |
| 7,363,218 B2 | 4/2008 | Jabri et al. | |
| 7,383,338 B2* | 6/2008 | Allen | 709/226 |
| 7,475,106 B2* | 1/2009 | Agnoli et al. | 709/201 |
| 7,525,289 B2* | 4/2009 | Janik et al. | 320/158 |
| 7,587,454 B2* | 9/2009 | Shabtai et al. | 709/205 |
| 7,609,652 B2* | 10/2009 | Kellerer et al. | 370/252 |
| 7,636,933 B2* | 12/2009 | Kortum et al. | 725/87 |
| 7,640,352 B2* | 12/2009 | Klemets et al. | 709/231 |
| 7,656,815 B2* | 2/2010 | Kellerer et al. | 370/252 |
| 7,721,339 B2* | 5/2010 | Madison et al. | 726/27 |
| 7,733,868 B2* | 6/2010 | Van Zijst | 370/394 |
| 7,743,161 B2* | 6/2010 | Dey et al. | 709/231 |
| 7,752,327 B2* | 7/2010 | Li | 709/231 |
| 7,760,801 B2* | 7/2010 | Ghanbari et al. | 375/240.03 |
| 7,801,158 B2* | 9/2010 | Voit et al. | 370/401 |
| 7,818,444 B2* | 10/2010 | Brueck et al. | 709/231 |
| 7,886,073 B2* | 2/2011 | Gahm et al. | 709/231 |
| 7,890,631 B2* | 2/2011 | Allen | 709/226 |
| 7,912,893 B2* | 3/2011 | Agnoli et al. | 709/201 |
| 7,937,485 B2* | 5/2011 | Whited et al. | 709/231 |
| 7,945,694 B2* | 5/2011 | Luzzatti et al. | 709/234 |
| 7,953,880 B2* | 5/2011 | Deshpande | 709/231 |
| 7,962,937 B2* | 6/2011 | Cho et al. | 725/44 |
| 7,983,526 B2* | 7/2011 | Ando et al. | 386/240 |
| 7,995,476 B2* | 8/2011 | Lou et al. | 370/232 |
| 8,001,261 B2* | 8/2011 | Katis et al. | 709/231 |
| 8,036,265 B1* | 10/2011 | Reynolds et al. | 375/240.01 |
| 8,135,769 B2* | 3/2012 | McCarthy | 709/201 |
| 8,145,785 B1* | 3/2012 | Finkelstein et al. | 709/233 |
| 2004/0057521 A1 | 3/2004 | Brown et al. | |
| 2004/0252761 A1 | 12/2004 | Brown et al. | |
| 2005/0049855 A1 | 3/2005 | Chong-White et al. | |
| 2005/0053130 A1 | 3/2005 | Jabri et al. | |
| 2005/0111363 A1 | 5/2005 | Snelgrove et al. | |
| 2005/0190794 A1* | 9/2005 | Krause et al. | 370/485 |
| 2005/0258983 A1 | 11/2005 | Jabri et al. | |
| 2007/0177606 A1 | 8/2007 | Jabri et al. | |
| 2007/0177616 A1 | 8/2007 | Jabri et al. | |
| 2007/0180135 A1 | 8/2007 | Kenrick et al. | |
| 2007/0201484 A1 | 8/2007 | Kenrick et al. | |
| 2007/0291106 A1 | 12/2007 | Kenrick et al. | |
| 2008/0195761 A1 | 8/2008 | Jabri | |
| 2008/0228921 A1* | 9/2008 | Allen | 709/226 |
| 2008/0267216 A1* | 10/2008 | Vergnaud | 370/474 |
| 2009/0031038 A1* | 1/2009 | Shukla et al. | 709/231 |
| 2009/0097551 A1* | 4/2009 | Zhang et al. | 375/240.03 |
| 2009/0147684 A1* | 6/2009 | Majidi-Ahy | 370/236 |
| 2010/0011103 A1* | 1/2010 | Luzzatti et al. | 709/226 |
| 2010/0031366 A1* | 2/2010 | Knight et al. | 726/26 |
| 2010/0106770 A1* | 4/2010 | Taylor et al. | 709/203 |
| 2010/0114921 A1* | 5/2010 | Bocharov et al. | 707/758 |
| 2010/0162125 A1* | 6/2010 | Alfred et al. | 715/738 |
| 2010/0169808 A1* | 7/2010 | Yu et al. | 715/764 |
| 2010/0191858 A1* | 7/2010 | Thomas et al. | 709/231 |
| 2010/0223392 A1* | 9/2010 | Pond et al. | 709/231 |
| 2010/0235881 A1* | 9/2010 | Liu et al. | 726/3 |
| 2011/0130092 A1* | 6/2011 | Yun et al. | 455/39 |

OTHER PUBLICATIONS

Pexxillo, Joe. "Demystifying Apple's Push Notification Service," Professional and Applied Computing: iPhone Advanced Products, 2009, pp. 311-344.*

Lin, Feida. "Operating System Battle in the Ecosystem of Smartphone Industry," Intl Symposium on Information Engineering and Electronic Commerce, May 17, 2009, pp. 617-621.*

U.S. Appl. No. 12/554,473, filed Sep. 4, 2008, Zhou.

International Search Report for PCT Application No. PCT/US2008/053605, mailed on May 23, 2008, 2 pages.

Written Opinion for PCT Application No. PCT/US2008/053605, mailed on May 23, 2008, 6 pages.

Non-Final Office Action for U.S. Appl. No. 12/029,119, mailed on Mar. 12; 2010; 11 pages.

* cited by examiner

| Compression Factor Value | Minimum Expected Bandwidth Reduction |
|---|---|
| 1 | 5% |
| 2 | 10% |
| 3 | 15% |
| 4 | 20% |
| 5 | 25% |
| 6 | 30% |
| 7 | 35% |
| 8 | 40% |
| 9 | 45% |
| 10 | 50% |

*FIG. 13*

METHOD AND APPARATUS FOR DELIVERY OF ADAPTED MEDIA

CROSS-REFERENCES TO RELATED APPLICATIONS

This application claims priority to U.S. Provisional Application No. 61/160,576, filed Mar. 16, 2009, entitled "Method and Apparatus for Media Optimization for Telecommunications Networks," and to U.S. Provisional Application No. 61/266,595, filed Dec. 4, 2009, entitled "Method and Apparatus for Delivery of Adapted Media," the disclosures of which are incorporated herein by reference in their entirety for all purposes.

BACKGROUND OF THE INVENTION

This invention relates generally to the field of telecommunications and more specifically to a method and apparatus for the delivery of multimedia content in a variety of telecommunications networks. In particular it involves the delivery of adapted multimedia content, and further the delivery of optimized multimedia content.

Studies of Deep Packet Inspection (DPI) logs on a number of mobile networks show that video traffic is predominantly due to "Video Browsing" and not "on-deck" video streaming. Video browsing includes access to videos on web sites such as YouTube—YouTube.com which accounts for about 5% (by volume) of all traffic.

The steep rise in video traffic is expected. Mobile internet usage is an increasingly popular market trend. About 15% of 3G users use 3G modems on their notebooks and netbooks to access the internet and video browsing is a part of this usage. The popularity of devices such as the iPhone is also having an impact as about 30% of iPhone users browse videos because of its wide screen feature and easy to use web browser. More devices are coming on the market with similar wide screens and HVGA resolutions and devices with Wide VGA screens are also becoming available (e.g. Samsung H1/Vodafone 360 H1 device with 800 by 480 pixel resolution).

Consumer video devices capable of recording high definition (HD-720 or 1080 height) videos are rapidly spreading in the market today. Not only cameras, but also simple to use devices such as the Cisco/Pure Digital Flip HD cam. These devices provide an increasingly simple way to share videos. The price point of these devices and the simplicity of their use and the upload of videos to the web will have a severe impact on mobile network congestions. Internet video is increasingly HD, and mobile HD access devices are in the market to consume such content.

AT&T reported that its wireless network traffic has quadrupled over the past year. Date: Oct. 13, 2009. http://www.att.com/gen/press-room?pid=4800&cdvn=news&newsarticleid=27226. Adrian Scase, head of the 3GPP, speaking at the Supercomm show in the US indicated that performance numbers "can be misinterpreted", he warned. "It's always dangerous when you extract one or two headline figures performance figures from a specification," he told the audience. Data rates per user will vary considerably, depending on a range of factors from the cell size, number of users in that cell, device type and interference conditions.

Wireless traffic is increasing and although peak bitrates are increasing significantly the variability in effective rates means that many networks will become congested and many users will experience varying levels of experience if these factors are not taken into consideration in media delivery.

Multimedia streaming services, such as internet TV (IPTV), video on demand (VoD), and internet radio/music, allow for various forms of multimedia content to be streamed to a diverse range of terminals in different networks. The streaming services are generally based on streaming technologies such as Real Time Streaming Protocol (RTSP), Hyper Text Transfer Protocol (HTTP) progressive download, Session Initiation Protocol (SIP), and variants of these standards (e.g. adapted or modified). We will refer to these protocols or their variations RTSP-like, HTTP-like and SIP-like.

Broadly speaking, three types of content are typically streamed, live, programmed, or on-demand. Programmed and on-demand generally use pre-recorded media content.

With streaming technologies, live or pre-recorded media is sent in a continuous stream to the terminal which processes it and plays it (display video or pictures or play the audio and sounds) as it is received (typically within some relatively small buffering period). To achieve smooth playing and avoid a backlog of data, the media bit rate should be equal to or less than data transfer rate of the networks. Streaming media are usually compressed to bitrates which can meet network bandwidth requirements. As the transmission of the media is from a source (e.g. streaming server or terminal) to terminals, the media bit rate is limited by the bandwidth of the network uplink and/or downlink. As the problems encountered in the uplink and downlink are fundamentally similar, and without a loss of generality, we will use the downlink case in our illustrations.

The networks supporting multimedia streaming services are packet-switched networks, which include 2.5G, 3G/3.5G packet-switched cellular network, their 4G and 5G evolutions, wired and wireless LAN, broadband internet, etc. These networks have different downlink bandwidths because different access technologies are used. Further, the downlink bandwidth may vary depending on the number of users sharing the bandwidth, or the quality of the downlink channel.

Consider cellular networks as examples. A cellular network is a radio network made up of a number of cells each served by a fixed transmitter, known as base station. Within a cell, a mobile terminal (handset or a PC with a wireless/cellular access card) receives and sends signals over radio waves through a base station. The downlink is the communication link used for the transmission of signals from a base station to the handset.

General Packet Radio Service (GPRS) in a 2.5G GSM cellular network can provide a typical throughput of 115 kbps. Enhanced Data Rates for Global Evolution (EDGE), which is a merely software enhancement over GPRS. 3G networks (e.g. WCDMA and CDMA-2000) offer higher high spectral efficiency and a theoretical maximum data rate of typically 384 kbps per user.

High-Speed Downlink Packet Access (HSDPA) is a 3G/3.5G communication protocol in the High-Speed Packet Access (HSPA) family. It is used in networks based on Universal Mobile Telecommunications System (UMTS) to improve downlink performance. Current HSDPA deployments support down-link data rates of 1.8, 3.6, 7.2 and 14.4 Mbps. Long Term Evolution (LTE) and Advanced LTE are new radio technologies that deliver access speeds that are five to 10 times that of HSPA respectively. Although each generation of networks includes enhancements (for example EDGE is an enhancement of GPRS), it is common to refer to 2.5G or 2.75G networks as 2G networks, as well as to the 3.5G, 3.75G networks as 3G networks.

Mobile online video viewing continues to thrive with the bandwidth expansions from 3G to 3.5G and 4G, and the availability of browsing and video friendly devices, such as netbooks and wide-screen handsets. Mobile video data has substantially increased today to account for about 30% of overall traffic on many mobile networks. Industry projections of video traffic point to a continuous acceleration and warn of looming mobile network congestions.

Although downlink bandwidths vary for different packet-switched networks, one common fact is that the downlink bandwidths are limited. Means have to be found to use this limited resource most effectively.

A challenge that multimedia streaming services bring to networks is that multimedia streaming services are data communication intensive applications where the perceived media quality is directly related to bitrates. On one hand, the network operators or services providers want to improve viewing or listening experience by transmitting high quality media with high bit rate; on the other hand, they need to restrict the media bit-rate to allow sound transmission for a given downlink and allow more users to access the service. This is the case regardless of the type of user terminal, whether it is a handset, netbook, laptop with a wireless/cellular data card, or a laptop/PC connected through the plain old modem, DSL, Cable or Ethernet. Without a loss of generality we will use the user mobile handset to illustrate a typical user terminal.

This multimedia communication challenge cannot be solved by simply increasing the downlink bandwidth by upgrading or replacing the existing network infrastructures. Firstly, the high cost of network expansion prevents network operators from continuously replacing the new network infrastructure. Secondly, upgrading networks usually requires user equipments to be upgraded too, which prevents the upgrades from bringing immediate benefits to the existing customers who are often reluctant to upgrade their user equipments.

Similarly, in the "wireline" world, the network bandwidth is limited by the type of connectivity (optic fiber, copper, fixed wireless). It is not simple for wireline operators to add bandwidth by upgrading their equipment. This is a costly and labor intensive operation.

To minimize the impact on networks and subscriber experience of this growth in video traffic, video traffic optimization strategies will be an unavoidable part of overall traffic optimization strategies of operators Thus, there is a need in the art for improved methods and systems for adapting multimedia content in various telecommunications networks to optimize media delivery.

SUMMARY OF THE INVENTION

Embodiments of the present invention provide methods and apparatuses that deliver multimedia content. In particular it involves the delivery of adapted multimedia content, and further optimized multimedia content.

According to an embodiment of the present invention, a method of transmitting optimized media to a client by an infrastructure device in a packet-switched network is provided. The method includes receiving a media stream at the infrastructure device. The method also includes determining an adaptation strategy according to one or more pieces of network information associated with the packet-switched network, one or more pieces of client information associated with the client, one or more pieces of media information associated with the media stream, or one or more policies. The method also includes adapting the media stream according to the adaptation strategy to produce an output media stream.

According to an embodiment of the present invention, an apparatus for optimizing the transmission of media to a client by an infrastructure device in a packet-switched network is provided. The apparatus includes a media adaptation and optimization module that executes a media adaptation and optimization strategy. The apparatus also includes an input module coupled to the media adaptation and optimization module and the input module adapted to receive a media stream. The apparatus also includes an output module coupled to the media adaptation and optimization module and the output module adapted to transmit an output media stream. The apparatus also includes a network information analyzing module coupled to the media adaptation and optimization module and the network information analyzing module adapted to analyze one or more pieces of network information. The apparatus also includes a client information analyzing module coupled to the media adaptation and optimization module and the client information analyzing module adapted to analyze one or more pieces of client information. The apparatus also includes a policy module coupled to the media adaptation and optimization module.

According to an embodiment of the present invention, a method of transmitting a media stream to a client by an infrastructure device in a packet-switched network is provided. The method includes receiving the first portion of an input media stream and copying through the first portion to the media stream. The method also includes determining a transition point in a second portion of the input media stream. The method also includes receiving the third portion of the input media stream and adapting the third portion to the media stream.

According to an embodiment of the present invention, a method of transmitting a media stream to a client by an infrastructure device in a packet-switched network is provided. The method includes receiving a first portion of an input media stream and copying through the first portion of the media stream. The method also includes receiving a second portion of the input media stream and determining a transition point in the second portion. The method also includes receiving a third portion of the input media stream and adapting the third portion to the media stream. In an embodiment the transition point may comprise a media frame that is decodable independent of a decoding of one or more previous media frames. In another embodiment the method may also include sending a signal to a media source associated with the input media stream, where the signal is a request for the media source to transmit the transition point.

According to an embodiment of the present invention, an apparatus for transmitting media to a client by an infrastructure device in a packet-switched network is provided. The apparatus includes a media optimization module that executes a media adaptation process. The apparatus also includes a proxy module coupled to the media optimization module and adapted to receive a media stream, where the proxy module is adapted to receive a request from a client directed to a server, and redirect one or more media elements of the request to the media optimization module.

According to an embodiment of the present invention, a method of modifying a media playlist to be delivered to a client by an infrastructure device in a packet-switched network is provided. The method includes receiving a media playlist from a server that comprises two or more alternative encodings of a media stream. The method also includes modifying the media playlist to produce a modified media playlist. The method also includes delivering the modified media playlist to the client.

According to an embodiment of the present invention, a method of determining a fingerprint of a media content by an infrastructure device in a packet-switched network is provided. The method includes requesting the media content from a server. The method also includes receiving one or more potions of the media content from a server. The method also includes determining a fingerprint using some part of at least a portion of the one or more portions and one or more processing parameters. The method also includes using the fingerprint to determine a presence of a processed media content in a cache associated with the infrastructure device. In an embodiment the processed media content is produced from the media content utilizing the one or more processing parameters. In another embodiment, determining the fingerprint comprises processing one or more HTTP headers, one or more media headers and one or more portions of a media stream.

According to an embodiment of the present invention, a method of transmitting media to a client by an infrastructure device in a packet-switched network is provided. The method includes receiving a media stream at the infrastructure device. The method also includes determining an adaptation strategy. The method also includes adapting the media stream according to the adaptation strategy to produce an output media stream delivered to a client over a connection. The method also includes modifying the adaptation strategy according to at least one or one or more pieces of feedback from a lower layer than an application layer for the connection or one or more statistics from the lower layer than the application layer for the connection. In an embodiment the connection is a TCP connection and the lower layer is the TCP layer. In another embodiment the one or more pieces of the feedback are TCP feedback.

According to an embodiment of the present invention, a method of transmitting media to a client by an infrastructure device in a packet-switched network is provided. The method includes determining one or more first seek points associated with a first media stream. The method also includes determining one or more second seek points associated with a second media stream. The method also includes determining one or more third seek points associated with a third media stream. The method also includes producing an element containing the one or more first seek points, the one or more second seek points and the one or more third seek points. The method also includes delivering the element to the client. The method also includes delivering media from the first media stream, the second media stream and the third media stream.

Depending upon the embodiment, one or more of these benefits, as well as other benefits, may be achieved. The objects, features, and advantages of the present invention, which to the best of our knowledge are novel, are set forth with particularity in the appended claims.

The present invention, both as to its organization and manner of operation, together with further objects and advantages, may best be understood by reference to the following description, taken in connection with the accompanying drawings.

BRIEF DESCRIPTION OF THE DRAWINGS

FIG. 13 illustrates a table of predefined compression factors and associated bandwidth reductions according to one embodiment of the invention;

DETAILED DESCRIPTION OF THE INVENTION

A Multimedia/Video Adaptation Apparatus and methods pertaining to it are described in U.S. patent application Ser. No. 12/029,119, filed Feb. 11, 2008 and entitled "METHOD AND APPARATUS FOR THE ADAPTATION OF MULTIMEDIA CONTENT IN TELECOMMUNICATIONS NETWORKS" and the apparatus and methods are further described in U.S. patent application Ser. No. 12/554,473, filed Sep. 4, 2009 and entitled "METHOD AND APPARATUS FOR TRANSMITTING VIDEO", the disclosures of which are hereby incorporated by reference in their entirety for all purposes. The platform allows for the deployment of novel applications and can be used as a platform to provide device and network optimized adapted media amongst other uses. The disclosure of the novel methods, services, applications and systems herein are based on the Dilithium Content Adaptor platform. However, one skilled in the art will recognize that the methods, services, applications and systems, may be applied on other platforms with additions, removals or modifications as necessary without the use of the inventive faculty.

Traffic Bottlenecks and OpEx Costs in Mobile Networks

Wireless traffic is increasing and although peak bitrates are increasing significantly the variability in effective rates means that many networks will become congested and many users will experience varying levels of experience if these factors are not taken into consideration in media delivery.

Figure 1:
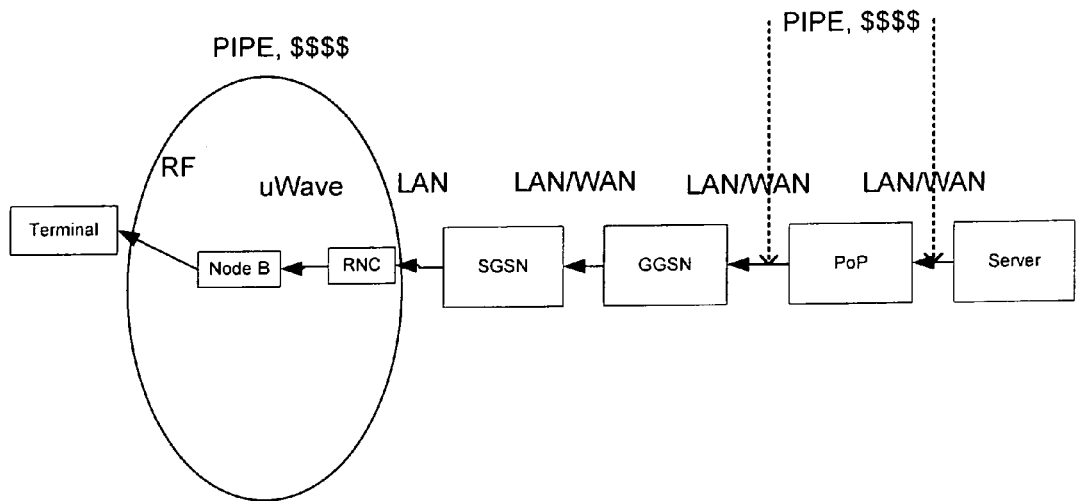
FIG. 1 illustrates bottlenecks and areas of operational expenditure in 3G and LTE networks in the context of video traffic according to one embodiment of the invention.

FIG. 1 illustrates bottlenecks and areas of operational expenditure (OpEx) costs in 3G and LTE Networks in the context of video traffic. The network is simplified. The terminal may be a netbook, a smart phone or a number of other connected devices. The radio access consists of a node B and Radio Network Controller (RNC). The Serving GPRS Support Node (SGSN) and Gateway GPRS Support Node (GGSN) are in an operator's packet network. The server, providing multimedia content, in this case may be an internet content service, such as YouTube, Yahoo!, Google Video, Facebook, Bebo or MySpace.

Bandwidth Throttling Does not Apply to Video

The application of traditional bandwidth throttling techniques (e.g. reducing data throughput) to video does not yield as effective results as the throttling of email and web browsing. Video throttling, if not performed intelligently, will cause customer churn as significant impairment of the visual experience will result. For example, if the packet bandwidth of a session is reduced from 200 kbps to 64 kbps, without video specific optimization, then the visual experience will be dramatically affected, resulting in frequent breaks in the video playing, as well as lengthy buffering periods. On the other hand, if the video bandwidth itself was reduced to 64 kbps (instead of the whole session bandwidth simply reduced by 60%) then the visual experience will be significantly improved as temporal and spatial tradeoffs can be maintained.

Networks without Video Optimization

Figure 8:
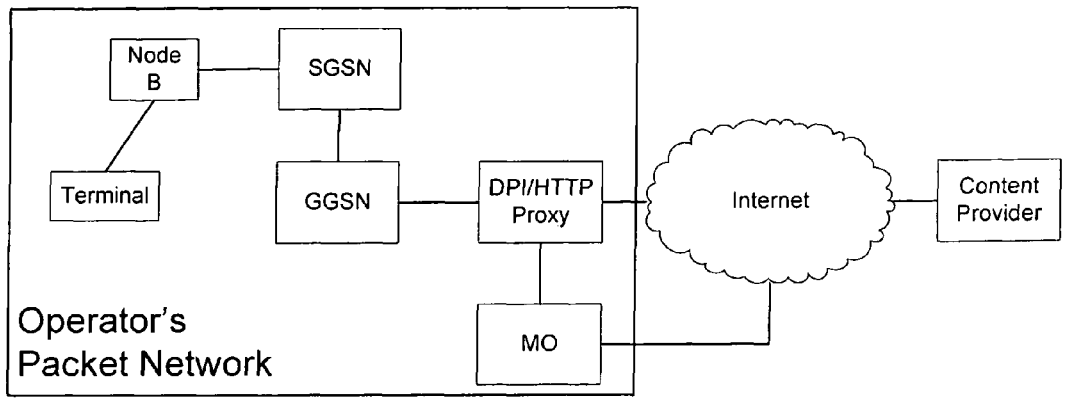
FIG. 8 illustrates an example network topology before introducing optimization in network according to one embodiment of the invention.

FIG. 8 shows an example network topology before introducing an element for video traffic optimization. This network is a typical mobile network where subscribers can access content on portals such as YouTube through a number of network elements like Serving GPRS Support Node (SGSN) and Gateway GPRS Support Node (GGSN). The SGSN is the subscriber "serving" node, whereas the GGSN is the gateway to the packet network. The Deep Packet Inspection (DPI) or Proxy, or WAP Proxy, acts as a gateway to the open internet. Although mobile network technology has evolved considerably, such elements continue to exist in some forms at the logical level, although they may get collapsed or expanded, including at the physical and implementation level. For example in 4G and LTE, the key elements are logically reduced to two network elements, the Serving Gateway (SGW) and the Packet Gateway (PGW).

Embodiments of the present invention provide many benefits. These benefits are provided by methods and apparatuses that can optimize bandwidth delivery of multiple formats of media content to terminals over a range of networks and network conditions. Another benefit is to provide a reduction in rate by modifying media characteristics that can include as examples frame sizes, frame rates, protocols, bit-rate encoding profiles (e.g. constant bit-rate, variable bit-rate) coding tools, bitrates, special encoding, such as error correction coding (FEC), and the like. Another benefit is to provide a better use of network resources allowing delaying or avoidance of replacement or additional network infrastructure equipment and user equipments. Another benefit is to allow a richer set of media sources to be accessed by terminals without requiring the additional processing and storage burden of maintaining multiple formats of each content asset. A further benefit is to shape network traffic and effectively control network congestion. Yet another benefit is to provide differentiated services to allow for premium customers to receive premium media quality. Another benefit is to allow content to be played back more quickly on the terminal as the amount of required buffering will be shorter. Another benefit is to improve user experience by adaptively adapting and optimizing media quality on-the-fly et cetera. A yet further benefit provides for increased cache utilization for source content that cannot be identified as identical due to differences in the way the content is served. A further benefit is the use of lower level feedback and statistics to more quickly and effectively adapt a media bitstream for transmission.

Other objects and advantages of the present invention will become apparent from the following description, taken in connection with the accompanying drawings, wherein, by way of illustration and example, embodiments of the present invention are disclosed.

Figure 2A:
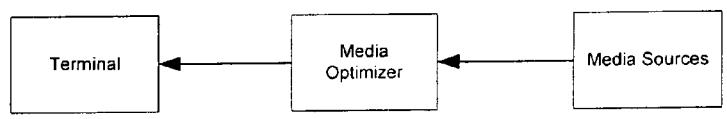
FIG. 2A illustrates a media optimizer deployed between a terminal and media source according to an embodiment of the present invention.

An embodiment of the invention can provide a network infrastructure element, namely a media optimizer or multimedia optimizer (MO). The MO can optimize media delivery in packet-switched networks by adapting bit-rates of media traffics from media services, such as media streaming, video sharing, video mail and other services, based on a number of conditions, factors and policies. As shown in FIG. 2A, the MO can be located between one or more terminals and one or more media from sources such as live encoders, content servers, streaming servers, media switches and routers, terminals, and so on. The MO can work as a media proxy. The network can redirect all media requests such as local or network file reads of all media container formats, HTTP requests to all media container formats, all RTSP URLs, SIP requests through the MO and others. Media to terminals will be transmitted from the media source or other terminals through the MO. The MO can reduce the total bandwidth required for delivering media to terminals by determining and using optimization strategies based on a number of conditions, factors and policies to reduce media bit-rates for the media provided to each terminal. The reduction in total bandwidth per user in the MO allows more users on the network to use the downlink bandwidth to access data services such as media streaming, web browsing, data downloading or other services.

The MO can be deployed by operators and service providers in various networks such as mobile packet (2.5G/2.75G/3G/3.5G/4G and their evolutions), wired LAN, wireless LAN, Wi-Fi, WiMax, broadband internet, cable internet and other existing and future packet-switched networks.

The MO can adapt the media for live and on demand delivery to a wide range of terminals, including laptops, PCs, set-top (cable/home theatre) boxes, Wi-Fi hand-held devices, 2.5G/3G/3.5G (and their evolutions) data card, handsets such as Nokia N95/N96, Blackberry Bold, Blackberry Storm, Google G1, Apple iPhone, Apple iPod Touch and the like.

The MO can adapt the media to different bitrates and to use alternate codecs from the source for different terminals and networks with different bandwidth requirements. The adaptation process can be on-the-fly and the adapted media can work with native browsers or streaming players on the terminals. The bit-rate adaptation can happen during a streaming session (dynamically) or only at the start of new session. The MO is transparent to terminals and to the users.

Figure 2B:
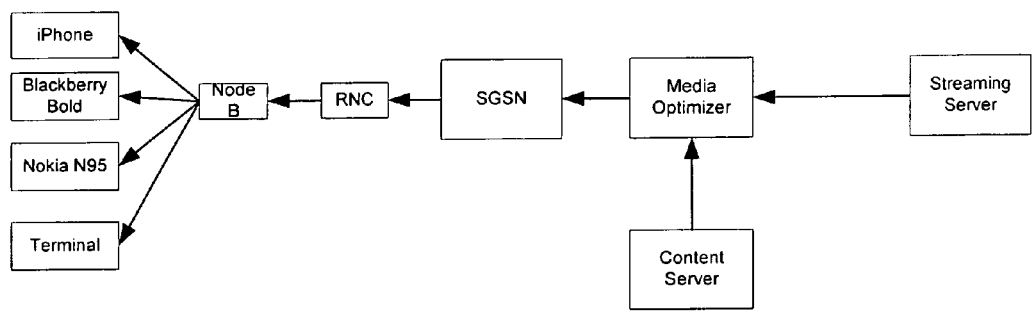
FIG. 2B illustrates a media optimizer deployed in a UMTS 3G cellular network according to an embodiment of the present invention.

FIG. 2B shows the MO deployed in a UMTS 3G/3.5G network according to an embodiment of the present invention. In the figure, the Serving GPRS support node (SGSN) is the central element in the packet-switch network. The Node B is the UMTS equivalent of a base station transceiver. The Radio Network Controller (RNC) controls one or more Node Bs. The media sources from streaming servers or content servers in local or remote networks can be transmitted to user equipments (UE) in the Node-B cell through the MO. The UEs in the cell can be iPhone, Blackberry Bold, Nokia N95 or other devices. The MO can optimize media delivery to mobile user equipments in UMTS 3G/3.5G cellular network. Note that in 4G evolutions of the 3G networks, the radio is different, but the base stations and packet core network may have different names (evolved node B, evolved packet core) and physical, medium access and network layers, but the principles are the same.

Consider a scenario that an iPhone user in UMTS 3G coverage accesses a video portal website designed for the broadband users as an example. iPhone can support HTTP progressive download of 3GP, 3GP2, MOV and MP4 files encapsulating MPEG-4 or H.264 video, and MP3, AMR, or AAC audio. In order to support more users in a cell, 3G/3.5G operators normally cap the theoretical maximum data transfer to a lower value, such as 196 kbps. A typical video portal website for the broadband users provides videos encoded at 384 kbps or higher. If the iPhone user wants to access a 3GP file encapsulating MPEG-4 video encoded at 384 kbps and AMR audio encoded at 12.2 kbps, the total bandwidth required for the iPhone to download progressively is about 396.2 kbps, which exceeds the available downlink bandwidth for the iPhone. If the 3GP file is transmitted to iPhone directly without going through the MO, the iPhone user would not be able to watch a continuous playback or have to suffer from a huge initial delay. If the MO is deployed in the network, the MO can receive the HTTP request to the 3GP from the iPhone. The MO can detect that the 3GP file is requested from an iPhone in 3G. Then it can determine that a video bit-rate such as 160 kbps and a audio bit-rate such as 12.2 kbps can allow the iPhone progressively download the video. The MO can download the 3GP file and transcode the file to a lower bit-rate. The MO can still use MPEG-4 as the video format and reduce only the video bit-rate from 384 kbps to 160 kbps and leave the audio bit-rate unchanged. The total bandwidth required to transmit the video becomes about 172.2 kbps. And the MO can deliver the generated file to the iPhone by using HTTP progressive download technology.

In the same example, the MO can further optimize media delivery by transcoding the original MPEG-4 video encoded at 384 kbps to H.264 encoded at 160 kbps. Because H.264 can offer better compression efficiency than MPEG-4, the H.264 video being delivered to the iPhone can have better video quality the MPEG-4 video even they are encoded at the same bit-rate.

In the same example, the MO can further reduce the media bit-rate if the MO receives a feedback from the network that the network is congested. The MO can reduce the current media bit-rate from about 172.2 kbps to a lower value which the MO can calculate by using the network congestion level, current bit-rate and other parameters. This way, the transmission of the media will consume less network bandwidth, so the number of users that can be served by the network will be increased. It will also allow the network to recover sooner from the congestion. When the network is not congested, the MO can increase current media bitrate to a higher value, so user can enjoy better quality.

Extending the example, the MO can also offer similar media advantages converting the ubiquitous Adobe (Macromedia) FLV e.g. a YouTube clip to be delivered to a web browser on a netbook/notebook that accesses the YouTube content over the 3G network via a 3G modem.

Figure 3A:
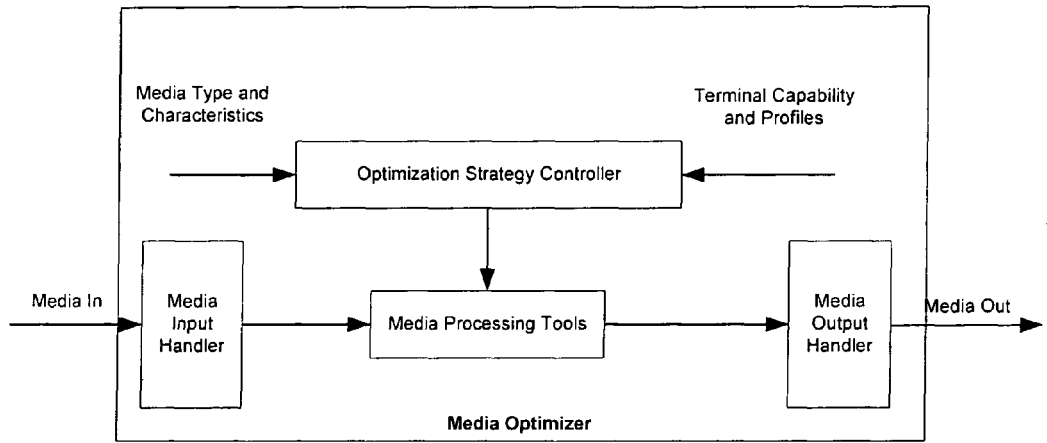
FIG. 3A illustrates a high-level architecture of a media optimizer according to an embodiment of the present invention.

FIG. 3A shows a high-level architecture of the MO according to one embodiment of the invention. The MO can have a media input handler module, a media output handler module, an optimization strategy controller module, and a media processing tools module.

Figure 3B:
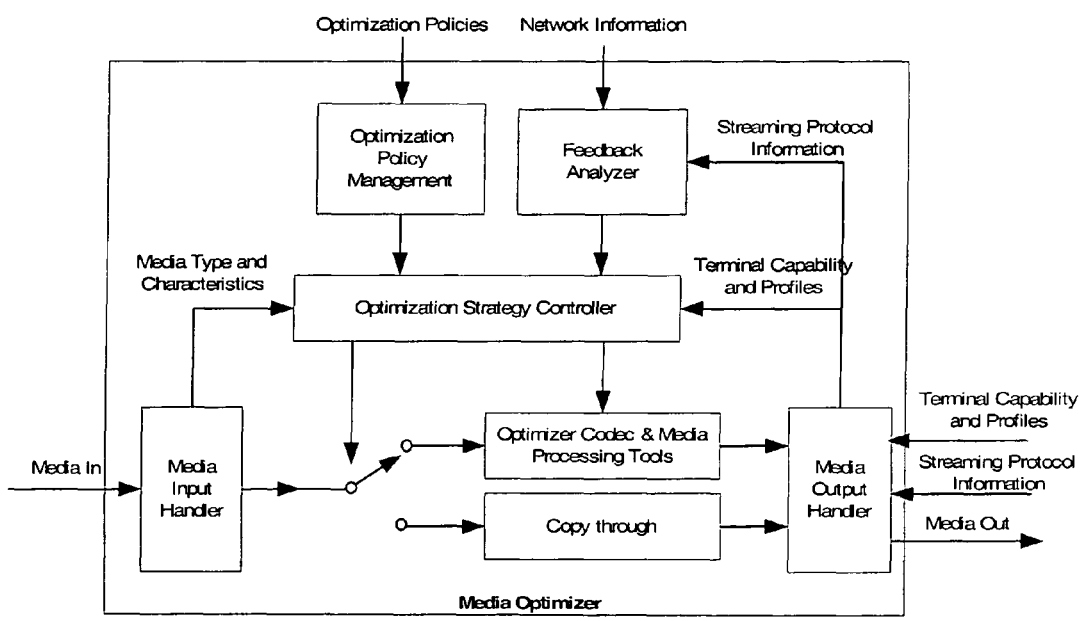
FIG. 3B illustrates a further high-level architecture of a media optimizer according to an embodiment of the present invention.

FIG. 3B shows another high-level architecture of the MO according to one embodiment of the invention. Besides all the modules shown in FIG. 3A, the MO can also have a feedback analyzer module, and a copying through module.

One embodiment of the present invention provides the media input handler that can read input media content from local or network media files and receive the input multimedia content streamed by using streaming technologies such as RTSP, HTTP progressive download, SIP, and other media delivery technologies. The MO can take a large number of types of input multimedia content including audio and video data in compressed and uncompressed formats. A content adapter that may be co-located with the MO and provide support for various input and output characteristics is described in U.S. patent application Ser. No. 12/029,119, filed Feb. 11, 2008 and entitled "METHOD AND APPARATUS FOR THE ADAPTATION OF MULTIMEDIA CONTENT IN TELECOMMUNICATIONS NETWORKS", the disclosure of which is hereby incorporated by reference in its entirety for all purposes. The video compression formats that can be provided with an advantage by the MO include: MPEG-2/4, H.263, Sorenson H.263, H.264/AVC, WMV, On2 VP6 and other hybrid video codecs. The audio compression formats that can be provided with an advantage by the MO include: MP3, AAC, GSM-AMR-NB, GSM-AMR-WB and other audio formats, particularly adaptive rate codecs. The supported input and output media file formats that can be provided with an advantage with the MO include: 3GP, 3GP2, MOV, FLV, MP4, MPG, AVI, WAV, WMV, WMA and others.

The media input handler can also provide information of the incoming media type and characteristics, or embedded/meta information, to the optimization strategy controller for optimization strategy determination.

One embodiment of the present invention provides the media output handler that can deliver the optimized media content by using streaming technologies such as RTSP, HTTP progressive download, SIP, and other media signaling and delivery technologies. The media output handler can collect client feedbacks from the network protocols such as RTCP, TCP, and SIP and provide to the optimization strategy controller. The media output handler can also collect the terminal capabilities and profiles from the streaming protocols such as user agent string, Session Description Protocol, or capability profiles described in RDF Vocabulary Description Language, and provide them to the optimization strategy controller.

One embodiment of the invention provides a feedback analyzer that can receive and analyze various feedbacks and network intelligence, and adaptively send the optimization strategy controller commands of bit-rate optimization. The feedbacks and network intelligence can be congestion, the number of users being served, data rate of the media traffic, indications of media quality, time of day and historical data (pre-emptive adjustments at peak times) and others. The feedbacks and network intelligence can be provided by other components of the networks. In 2.5G and 3G cellular networks, they may be provided by base stations, base station controllers or Serving GPRS Support Node (SGSN). In Wi-Fi networks, they may be provided by Access Point (AP).

Feedbacks and network intelligence can also be provided by various protocols at various levels. In one embodiment of the invention, the media output handler module can send client feedbacks to the feedback analyzer. The Transmission Control Protocol (TCP) used by HTTP progressive download enables terminals or intermediate nodes to send acknowledgements to indicate window sizes, packet loss rate and others. The Real Time Control Protocol used by RTSP and SIP enables terminals to send Receiver Reports which include indications on the effective bitrates received by the terminals.

One embodiment of the invention provides an optimization policy management module that can provide an interface for operators or service providers to define various optimization policies to control the optimization strategy controller. The policies can be defined to serve multiple purposes. The policies can be saved in files or in databases. The policy management module can send optimization commands to the optimization strategy controller according to the defined policies.

One policy can be defined to have preferable media bit-rates for different time conditions. The policy can be defined for recurrence or for one time. For example, a policy can be defined to have a lower daily media bit-rate for peak time of day and a higher daily media off-peak time. For another example, a policy can be defined to have a lower bit-rate at the time of an upcoming big event that there will be predictable network congestion.

Another policy can be defined to restrict output media characteristic like setting a maximum video frame rate, video resolution, key frame interval, and other media parameters or using a different rate control algorithm.

Another policy can be defined to have preferable network transportation representation for certain networks for efficient transmission and better error resilience.

Another policy can be defined to have statistical means to ensure better overall bandwidth efficiency such as not generating intra-coded frames at the same time across multiple streams to avoid bit-rate bursts in networks. This can also remove or shift intra coded frames temporally in incoming bitstreams if they are detected to be temporally co-incidental in incoming streams.

Another policy can be defined to have a higher media bit-rate for advertisement content or pay-per-view content. This policy can be used to ensure advertiser satisfaction that their advertising content was at an expected quality. The system may also ensure that such "full-rate" media is shifted temporally to not be present on multiple channels at the same time.

Another policy can be defined to avoid reduce media bit-rate for users that are charged for amount of bits received such as data roaming and pay-as-you-go users.

Another policy can be defined to avoid reduce media bit-rate for media streams that are multi-casted for many users.

Another policy can be defined to restrict bandwidth for subscribers in regions known to be network 'hotspots' and to have different media bit-rates for different user profiles or levels of subscriptions to allow operators or services provider to offer differentiated services.

Figure 4:
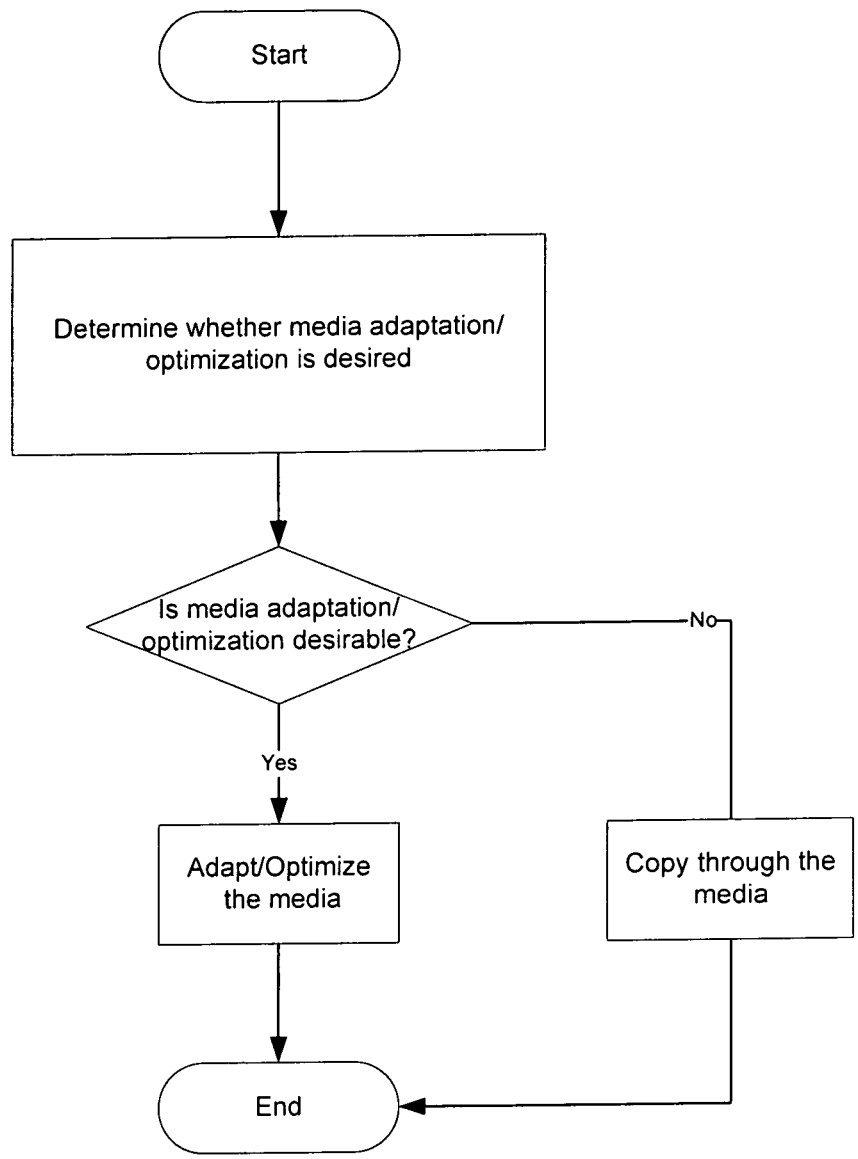
FIG. 4 illustrates a flowchart to determine to do copy-through or adaptation processing at the start of a new session according to an embodiment of the present.

One embodiment of the present invention provides the optimization strategy controller that can determine means to adapt the incoming media based on the signals, indications, and instructions received from the feedback analyzer, the optimization policy management, the media input handler, the outgoing media and network protocol handler. As shown in FIG. 4, the optimization strategy controller can determine first whether media adaptation is desirable at the start of a new session. If it decides that there is no need for the media adaptation based on all the conditions, the media from the incoming media and network protocols handler can be sent to the media output handler through a copy through; also known as pass through, module. The copy through module can forward the incoming media to the media output handler without modifying the media at the codec level. The copy through module can include a bitstream syntax scanning scheme to check the error in the media. If the media adaptation is desirable, the media can be sent to the optimizer codec and media processing tools module for adaptation by using an optimization strategy provided by the optimization strategy controller. The optimizer codec and media processing tools module offer media functions such as de-multiplexing (demuxing), transcoding, transrating, transsizing (scaling), multiplexing (muxing), and several adaptation schemes that can be used separately or together in order to reduce the media data amount these include encoder bitrate reduction, frame size reduction (in the case where the player is known to have the capability of displaying smaller frame sizes), letterboxing (side or top bars), codec substitution (for the case where the client player can support audio or video codecs which are capable of higher compression efficiencies than present in the source media), and other 'media thinning' measures such as reducing multi-channel or stereo audio signals to mono.

Figure 5:
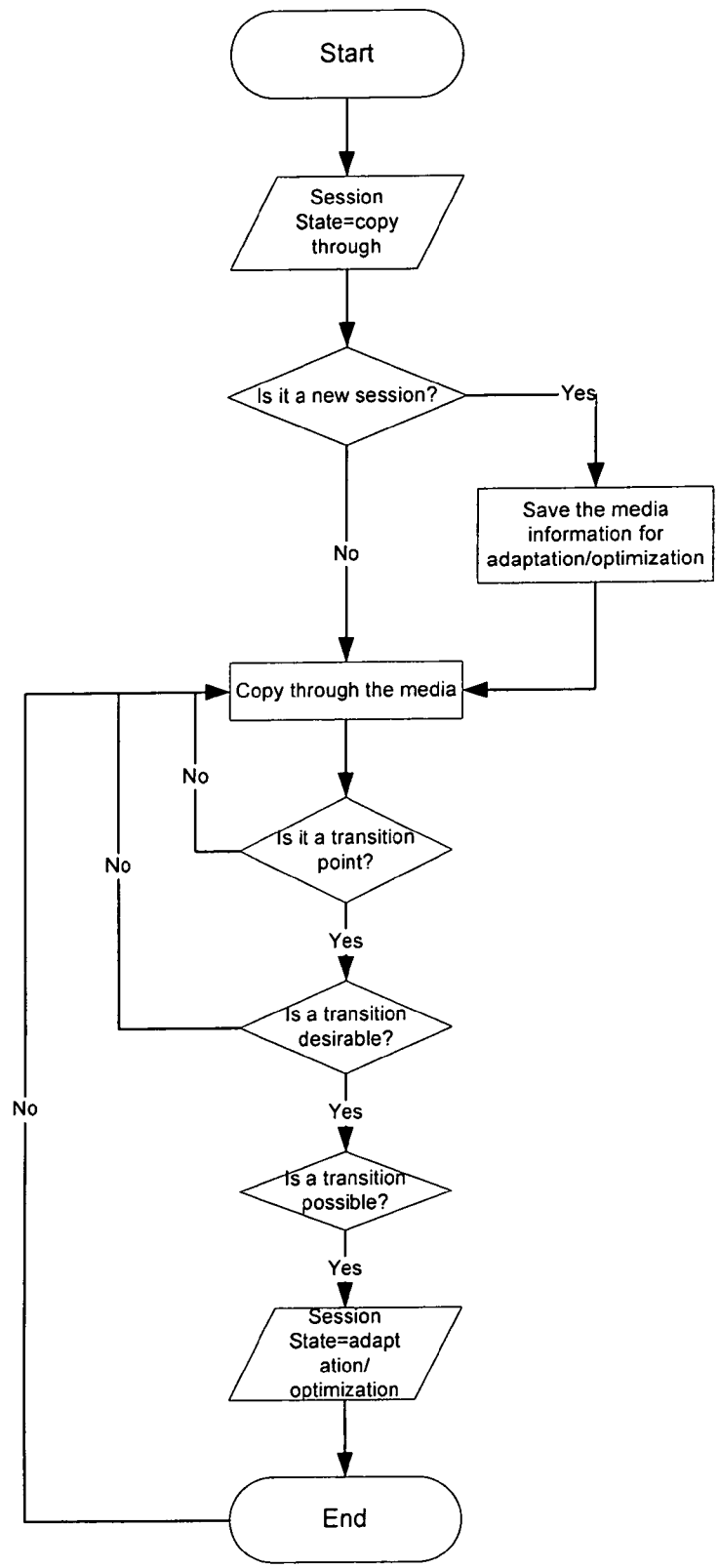
FIG. 5 illustrates a flowchart to determine to transition a session state from copy-through to adaptation and optimization according to an embodiment of the present.
Figure 6:
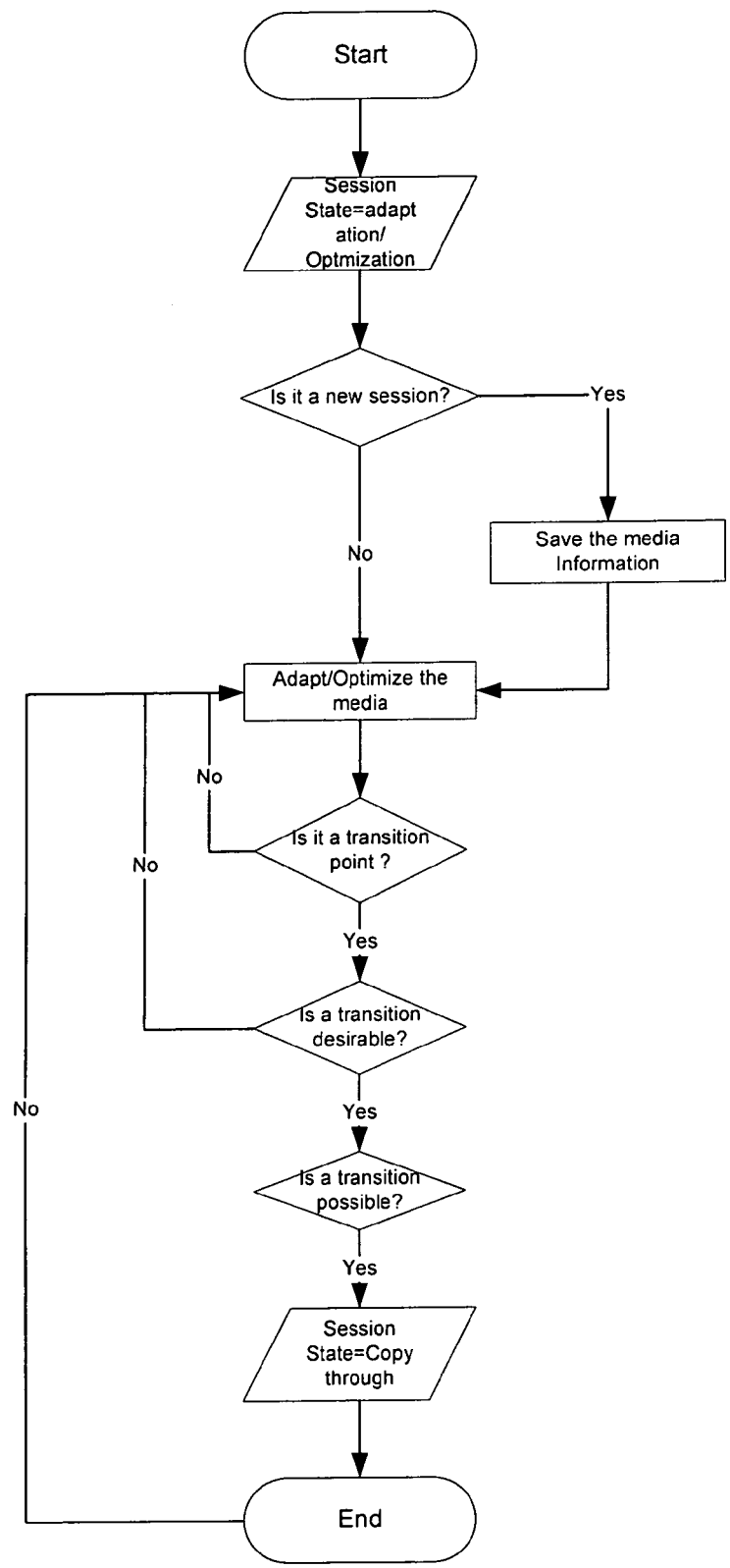
FIG. 6 illustrates a flowchart to determine to transition a session state from adapting and optimizing to copy-through according to an embodiment of the present.

One embodiment of the present invention provides that the optimization strategy controller can determine to modify a session from a copying through state to an adaptation state at a specific transition point if the signals and indications from the feedback analyzer and the optimization policy management suggest that the adaptation is desirable. In FIG. 5, a session is in a copying through state. If the session is a new session, the media information that is required by future media adaptation can be saved. The copy through session can continue till a transition point is reached. A transition point can be a media frame that the decoding of the media frame does not require any previous media frames. For example, a transition point can be an Intra-coded frame in video. The optimization strategy controller can detect transition points already in the media. It can also request the media source to send a transition point such as a video fast update. If a transition point is detected, the optimization strategy controller can check if there are signals, instructions, and indications from the feedback analyzer and optimization policy management indicating that the media adaptation is desirable. If the media adaptation is desirable, the optimization strategy controller can determine if the media adaptation is possible based on the media information saved at the start the session; otherwise, the copy through session continues. If the media adaptation is possible, the session state can be changed to an adaptation state; otherwise, the copy through session continues. Similarly, the optimization strategy controller can also determine to modify a session from an adaptation state to a copying through state at a specific transition point if the signals and indications from the feedback analyzer and the optimization policy management suggest that the adaptation is not desirable as shown in FIG. 6.

The MO achieves bit rate reduction with graceful degradation on perceived media quality (and has an operational mode that aims to have adapted bit rates such that the output is kept at a level above the level of user perception of degradation so that the advantages are obtained without dissatisfaction to the user). There are many techniques can be used to achieve this.

One technique is to reduce the number of bits allocated to each media frame (audio, video, etc . . . ) through the controls of the respective media codec bit allocation or selection. For example, in video this can involve coarser level of quantization either on a selective basis (region in video frame) or uniformly across a frame. For audio, this can involve the selection of a lower bit-rate mode of the codec. Most audio codecs support several compression modes with various quality implications.

Another technique is to reduce video bit-rate by decreasing video frame rate selectively based on video content type. The frame rate reduction can effectively reduce video bit-rate because fewer frames are encoded. For videos with slow motions, frame rate reduction will bring minimal loss on perceptual quality. The MO can determine the levels of the frame rate reduction based on motion in video.

Another technique is to convert a source media format to other media compression formats which have higher compression efficiency and are also supported by the terminal. To preserve the quality of the original media, the media bit-rate of the new compression format with higher compression efficiency can be to transcode to a bit-rate the new media quality is close to the original media quality. The new bit-rate can be determined by techniques such as doing bit-rate mapping between two compression formats based on statistical data or calculating bit-rate by minimizing the quality difference between the original media and the new media. For example, if a terminal supporting both the H.263 and H.264 video standards requests a video that is originally encoded in H.263, the MO can transcode the video to H.264 format. In the transcoding process, the MO can measure the quality difference between the original H.263 video and the output H.264 video by calculating Peak Signal-to-Noise Ratio (PSNR) and encode the H.264 video by minimizing the PSNR. Thus, and the video quality can be preserved and the video bit-rate will be reduced because of the higher compression efficiency of H.264 over H.263. This quality measurement can be performed in a temporally sub-sampled or spatial sub-sampled manner (e.g. region of interest) in order to reduce processing/computational intensity/effort.

Another technique is to reduce the total media bit-rate by reducing the audio bit-rate of the media in applications in which audio quality is less important than the video quality. Another technique reduces audio bit rate by using discontinuous transmission/voice activity detection when applicable (and even extending their thresholds for increased use) to be certain that silence is not sent as active speech.

Another technique is to reduce the total media bit-rate by reducing the audio channels present from multi-channels (5.1 or 7.1)/stereo to single/mono channels. A further technique is to reduce the sampling rate, for example from 48 kHz to 44.1 or even 24 kHz.

Another technique is to reduce the total media bit-rate by increasing the number of silence frame for audio. The silence frame in audio need fewer bits to encode compared to the non-silence frame and the audio bit-rate can be reduced.

Another technique for video is to improve motion vectors accuracy adaptively based on the requirements of bit-rates. More accurate motion vectors can provide more faithful reproduction of P frames, which leads to smaller residual. Consequently, the number of bits needed to encode the residual is reduced and the video quality will even improve. There are many ways to improve motion vectors accuracy, such as using more accurate motion search algorithms, increasing motion search ranges, using more than one reference frames if supported and so on. Various techniques such as these can introduce additional processing power and memory consumption, these increases in resource consumption can be acceptable in some circumstances and the trade-off of network processing for spectral efficiency is part of the selection algorithm.

Another technique for video is to improve accuracy of mode selections adaptively based on the requirements of bit-rates. In some video codecs, such as H.264, multiple intra and inter prediction modes can be used. Accurate mode selection algorithms can greatly reduce video bit-rate without losing video quality, but they will also require additional processing power and memory.

Another technique for video is to determine the Region of Interest (ROI) to encode. The areas not in the ROI can be encoded to coarser quality with fewer bits. The ROI can be determined by the content types like news, sports, or music TV, or may be provided in meta-data.

Another technique is to encode video based on a texture analysis of the video. The regions that have complex texture information need more bits to encode but they may not be important to viewer especially in video streaming application. For example in a basket ball game, the high texture areas (like the crowd or even the parquetry) may not be as interesting as viewers tend to focus more on the court area, the players and more importantly on the ball. Therefore, the lower texture area of the basketball court is significantly more important to reproduce for an enhanced quality of experience.

Another technique is to reduce the viewable video size by adding thin black banners on the edges of video. Black banners could be on all sides or on selected sides or could be determined in context of ROI analysis or texture analysis. This may not be perceptually noticeable as users are accustomed to viewing wide and narrow angle screens. The video bit-rate will be reduced because the black banners require much fewer bits to encode compared to the areas being replaced. Coding a strip of an appropriate size to the codec (e.g. 4, 8 or 16 pixels high and/or wide) is efficient at saving bits. The degradation on the perceived quality is very small because human eyes tend to focus on the center of video.

Another technique for video in the case where multiple related video streams from a non MVC/H.264 coded source, in any codec, are being sent to a terminal capable of MVC/H.264 decoding, is to recode the streams at the MO. This saves substantially on media rates.

Figure 7:
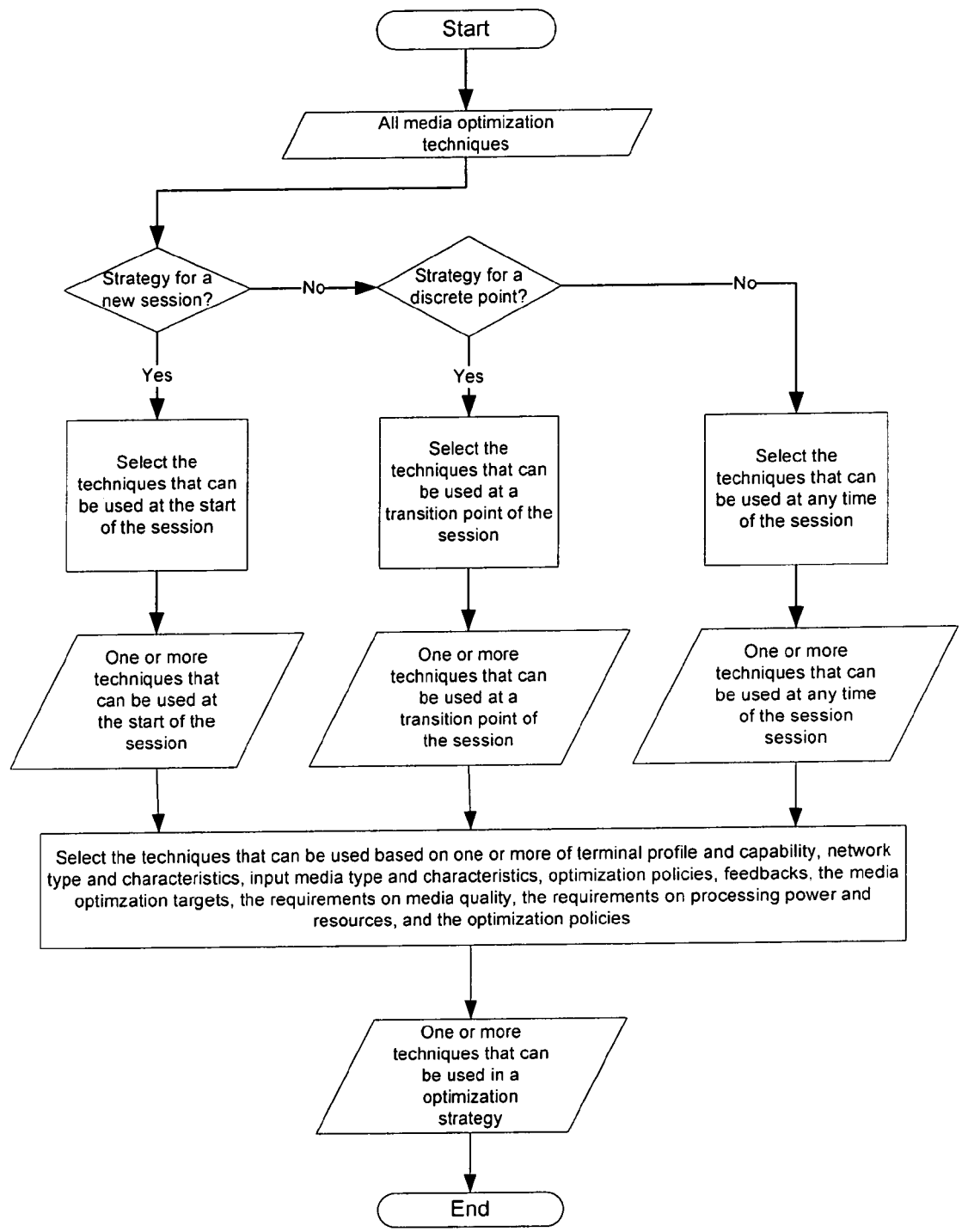
FIG. 7 illustrates a flowchart to determine an optimization strategy for media optimization according to one embodiment of the invention.

One embodiment of the present invention provides that the MO can optimize media delivery by using an optimization strategy that combines one or more media optimization techniques. FIG. 7 shows a flowchart to determine an optimization strategy for media optimization according to one embodiment of the invention. All the media optimization techniques can be considered as a toolbox. If the optimization strategy is to be determined for a new session, the toolbox can be filtered by selecting one or more techniques that can be used at the start of the new session. If the optimization strategy is for a discrete point that can be a media frame that it can be decoded independently without any previous media frames, one or more techniques that can be used for a discrete point can be selected for the optimization strategy. Otherwise, one or more techniques that can be used at anytime of a session can be selected for the optimization strategy. The selected techniques can then be filtered according to various conditions and factors such as terminal profile and capability, network type and characteristics, input media type and characteristics, optimization policies, feedbacks, the media optimization targets, the requirements on media quality, the requirements on processing power and resources, the optimization policies and so on.

An optimization strategy can also be updated adaptively during a session. The MO can add or remove one or more techniques based on a number of run-time conditions and factors such as terminal profile and capability, network type and characteristics, input media type and characteristics, optimization policies, feedbacks, the media optimization targets, the requirements on media quality, the requirements on processing power and resources, the optimization policies, time of day and so on.

For example, if a terminal supporting more than one video compression format initiates a new request to a slow-motion video and bit-rate reduction is desirable, a strategy can be that:

Convert the media to the format with highest compression efficiency that the terminal supports.

Analyze the media characteristics to get the level of frame rate reduction.

Reduce the amount of bits allocated to each media frame.

For another example, if a feedback of network congestion indicates that a bit-rate reduction is desirable during delivery of a video with fast motions, a strategy can be that:

Reduce the amount of bits allocated to each media frame.

Reduce audio bit-rate if it is determined that the audio quality is less important than the video.

Change to use a motion search algorithm that gives more accurate motion vectors if the requirements on processing power and resources allow.

Change to use a mode selection algorithm that gives more accurate intra and inter prediction mode if the requirements on processing power and resources allow.

Allocate more bits to encode ROI. The ROI can be pre-defined regions or determined by ROI analysis if the requirements on processing power and resources allow.

Do texture analysis if the requirements on processing power and resources allow and allocate more bits to encode low texture area.

Add black banners to the edges of the video. The banners can be on any of top, bottom, left and right edge or they can be determined in context of ROI analysis or texture analysis.

Another application of the invention is for media-layer back-hauling. It is known that backhauling of data today benefits from data compression, irrespective of what the data represents. The invention described above allows the compression at the media layer instead of just the lower data link layers. The optimization of bandwidth at the media layer as described above represent a new tool for back-hauling that will allow the delivery of backhauled content in a more cost and time effective fashion.

Figure 9A:
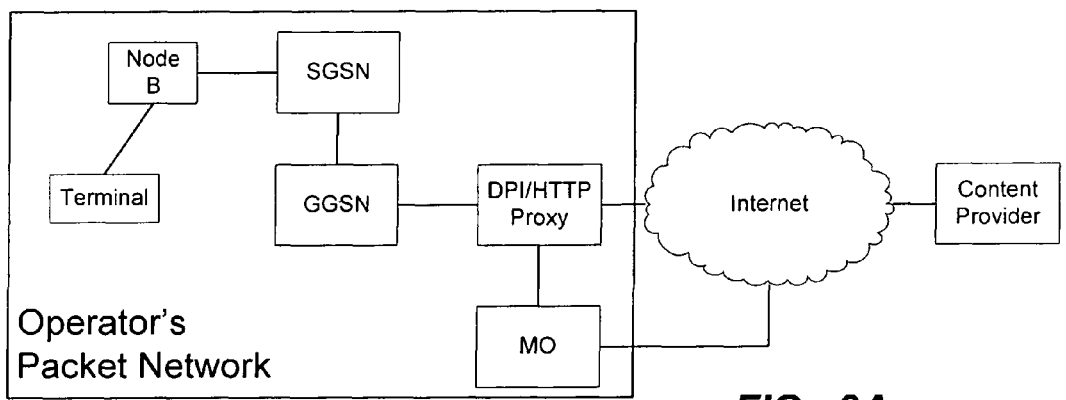
FIG. 9A illustrates an example network topology after deployment of MO in network according to one embodiment of the invention.

FIG. 9A illustrates the network topology with a video traffic optimization element which we call a media optimizer (MO); it may also be called a Multimedia Optimizer or a Video Optimizer (e.g. Dilithium Video Optimizer or DVO). The MO performs several media (audio and video) traffic optimization functions as we will detail later in the document.

Figure 9B:
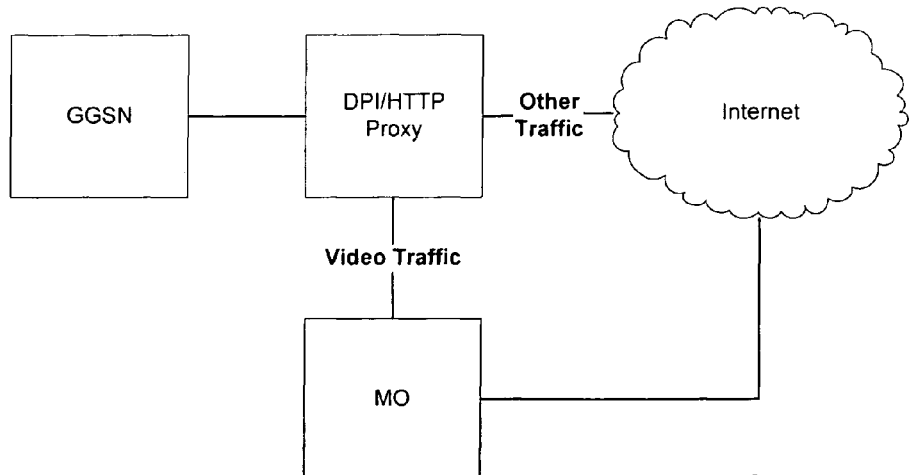
FIG. 9B illustrates traffic segregation according to one embodiment of the invention.

FIG. 9B illustrates traffic segregation directing selected traffic, in this case video, to the MO. Although this illustrates video, other kinds of content, for example media can be segregated and processed differently on delivery. Examples being conversion of audio or textual content coded in a different language. Certain complementing adaptation of other elements might also be required in some situations. For example if container type, resolutions or other meta information are encoded in the HTML of a web page then these should also be changed to reflect the media adaptation that is occurring.

Figure 10:
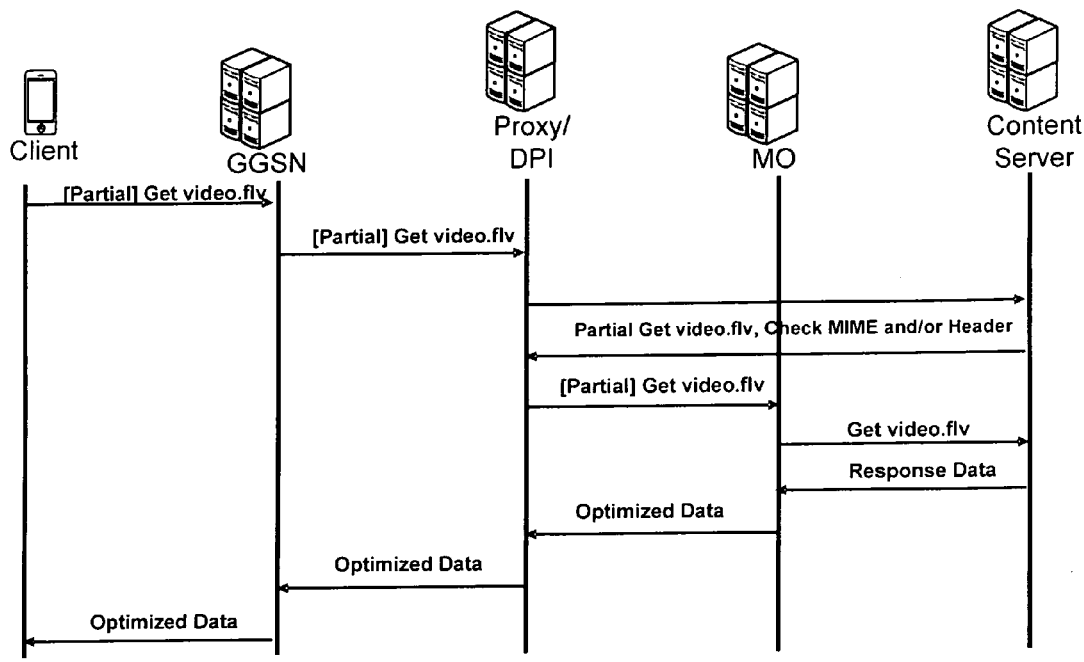
FIG. 10 illustrates a call flow showing key elements involved in a video optimization session according to one embodiment of the invention.

FIG. 10 illustrates a basic call flow of the messaging between the various network elements. Only key elements involved in a video optimization session are shown and some network elements are not shown for simplicity.

There are several steps involved in the invocation of the optimization of video traffic. The two key network elements involved are the DPI/HTTP Proxy and the MO. The steps to be performed by the DPI/Proxy described here are video optimization specific, however their application to other media is also possible. The DPI/Proxy here is "video aware" the element is labeled as a Smart Video Proxy (SVP). The key elements involved in the video traffic optimization are the SVP and the MO. The SVP and MO could be co-located or located separately or integrated in the same physical element.

Key steps invoked in the video traffic optimizations are:
1. URL Resolution: The URL entered by a user converted to an actual URL containing source file information. This could be done by the SVP.
2. Request Redirection: Redirection is done based on the content, typically via the content-type header in the HTTP response of the origin server to the GET request from SVP.
3. Determination of an Optimization Factor: Decision making on media adaptation and optimization to be performed, such as selection of a compression factor based on various parameters. This information is then provided to MO.
4. Source and Content Inspection: Providing access to only allowed sites or content before forwarding video playback requests to MO platform.

Each of the steps is described more fully in the following sections.

1. URL Resolution

According to an example a subscriber is accessing a video clip from YouTube. The user enters a URL in the browser (or follows a link) which is a full web page.
http://www.youtube.com/watch?v=5_30nI7-X4A&feature=related The URL has inside the data for the actual URL with FLV (media file). In the majority of cases this is handled by the client video player (e.g. Flash plug-in) to resolve to a URL for the requested video file. In some special cases the SVP may be required to resolve the video URL from a higher level request (such as when a client does not have the ability to execute the 'normal' video player, as is the case with some mobile devices).

SVP resolves the address above as
'http %3A %2F %2Fv15. 1scache8.c.youtube.com %2Fvideoplayback %3Fip %3D0.0.0.0%26sparam s %3Did %252Cexpire %252Cip %252Cipbits %252Citag %252Cburst %252Cfactor %26itag %3D34%26ipbits %3D0%26signature %3D88D182E4B6BF21737794E12B9 D049C6D4E3DB48F.3E3F835AFD883A4C519771BF79 CB974B6346B887%26sver %3D3%26expire %3D1254333600%2 6key %3Dyt1%26factor %3D1.25%26burst %3D40%26id %3De7fdf49c8efe5f80'.
The source is now directly accessible (and additional information made available).

2. Traffic/Request Segregation/Redirection

The SVP determines appropriate content and redirects content for optimization. One method of doing this is to check the content-type returned by the origin server for the GET request. If this matches a relevant content type such as 'video/fly' then it aborts the existing connection with the source server and makes a request to MO to pull the request through the optimization path instead (there is no HTTP redirection required at the client, it just sees a single connection to the proxy). Some content sites send FLV with content type text/plain, but having an extension .flv so in some embodiments the filter proxy uses the content type in conjunction with a URL regular expression.

Redirection is performed based on at least a filter using the source URL and the content-type header passed in the HTTP response of the origin server to GET request from SVP. A combination of these two strings may be used since although the majority of objects have the correct content-type defined by the server this is not always the case, tests have shown that some clips use incorrect content-type strings (such as text/plain) but the object can be identified as a video file as it uses the extension .FLV.

Figure 11:
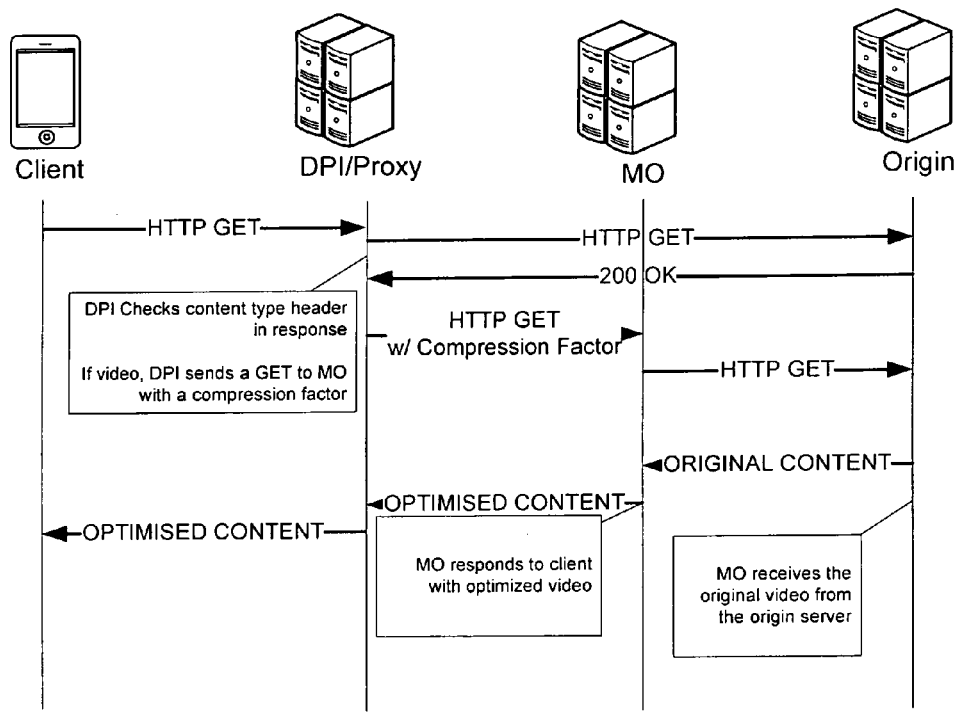
FIG. 11 illustrates details of call flow illustrating the steps invoked in the video traffic optimization according to one embodiment of the invention.

FLV video file Get requests are forwarded to MO only for the actual URL previously resolved. Consequently MO gets a request from SVP as illustrated in FIG. 11. FIG. 11 illustrates steps involved in video traffic optimization. SVP represents the DPI/HTTP Proxy Function. Origin represents the original content server.

Preferred embodiments of the optimization process performed by the MO and SVP utilizes a block-wise processing, that is to say that the SVP handles all of the content between MO and the client as it is delivered from Origin, rather than waiting for the entire object to be received before it is processed. This allows the server headers to be analyzed as they are returned, and allows the content to be optimized on the fly by MO. This confers the benefit of low delay in the processing and is unlikely to be perceptible to a user. An additional advantage is that the MO can also control data delivery rates into the network (not just media encoding rates) that would otherwise be under the control of the connection between the terminal and the origin server.

OPES/ICAP Server Integration

As an alternative to the use of a standalone proxy server to identify and redirect requests for video optimization the system may be integrated with a proxy or cache platform which supports ICAP (RFC 3507) or OPES (RFC3752) content vectoring. This has the advantage that the origin server sees only a single request for each object, rather than receiving multiple requests from different parts of the MO solution.

The operation of MO is largely independent of the content vectoring scheme in use (ICAP or OPES), the content vectoring host ('mainline' proxy/cache server) would be expected to divert responses considered relevant for MO operation (based on URL regular expression matches or similar rules) to a MO system to determine if they should be handled further.

Figure 12:
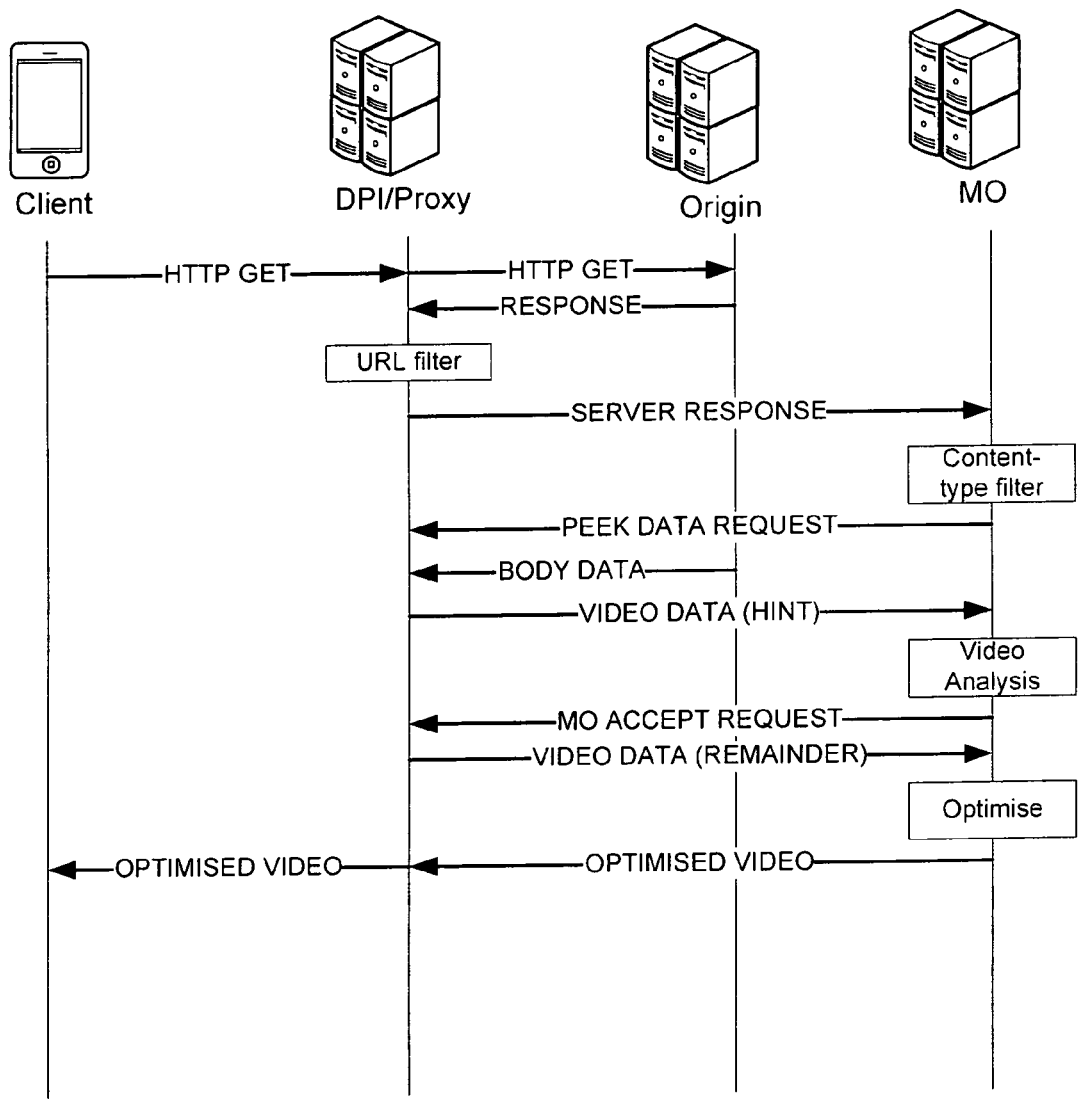
FIG. 12 illustrates a content vectoring server integrated with a media optimizer according to one embodiment of the invention.

The high level operation of a system implementing content vectoring is shown in FIG. 12. The content vectoring host is represented by DPI/Proxy. A request is made through the proxy and it is considered relevant for media optimization and is diverted to MO.

The MO system analyzes the server headers (similar to the standalone proxy case) to determine if the MO filtering criteria are met (content-type and URL regular expression match), if this is not the case, or if there is some other blocking condition (such as the MO system operating at maximum capacity, no optimization policy in effect etc) then the MO system will return a negative response to the vectoring host and the data will be passed directly back to the client.

If the MO matching criteria are met then the MO system will 'peek' at an initial block of body data to do further analysis of the source content for determination of the video and audio properties (such as container type, codecs, bitrates, frame-size etc).

Following this stage again the MO system may elect to reject the request, in which case the body data would be passed directly to the client as normal without any modification. This may happen if the video type (in terms of container or codec) cannot be supported by MO or is not recognized as a valid video file.

In this scenario only the proxy/vectoring host contacts the origin server, reducing traffic load and keeping network latency to a minimum.

In the case where the body data is a supported video format the MO would accept the request and would continue to receive and process the body data, performing optimization on each block as it is delivered and returning this back to the vectoring host for delivery to the client (delivery of cached content is also possible).

3. Determination of Optimization Factor

DPI lets through transparently all the data that is not destined to be optimized (in the example that is anything not FLV media) in that user requested web page. Video playback requests (FLV media) are forwarded to MO.

DPI may provide input for selection/determination of a compression factor to MO based on various factors gathered from network or databases consulted such as:

Current packet traffic load and bandwidth availability in network.

Estimated/Expected available bandwidth based of time of day.

Subscriber's MSISDN number, which may be used to determine a subscription type like platinum, gold, silver, bronze.

IMEI number of the handset to be used to determine the optimum bandwidth, or other characteristics.

Compression factor information can be carried in one of the HTTP headers, e.g. a Cookie header or a custom HTTP header that MO can interpret. A simple compression factor information format is mo_cf=4 although more information could be provided and MO may make more informed decisions based on this information and other information it has access to.

FIG. 13 shows a table of predefined compression factors and associated bandwidth reductions that are utilized in one embodiment.

4. Cache and Source Clip Inspection/Fingerprinting

A known issue with some content sites is that after the proxy resolves a video to a URI, the URI may be different even if we are accessing the same video source. This may happen because of common use of load balancing schemes of popular sites or even simply the presence of unique identifiers for tracking requests.

Since one embodiment of MO uses the source URI and the target parameters to find a cache hit, if the source URI is a different site location (due to origin server redundancy) for the same content then the cache entries would not match and cache efficiency would degrade. In the case of unique identifiers in the URI cache hits do not occur at all.

An approach to determine content identity is to "fingerprint" the source clips, in order to determine whether they are cached or not regardless of the server location for a similar URL.

The finger printer may use a combination of information from the HTTP server headers (for example last-modified and content-length if they are present), the clip header which contains clip info, as well as some of the bitstream data in the clip. The fingerprints may also use some information in the URI. The resulting fingerprint information may then be hashed. For a new clip keys are created and stored in a table. The determination of whether a clip is in the cache or not becomes a question of whether the hash value of the clip is in the hash table.

Figure 14:
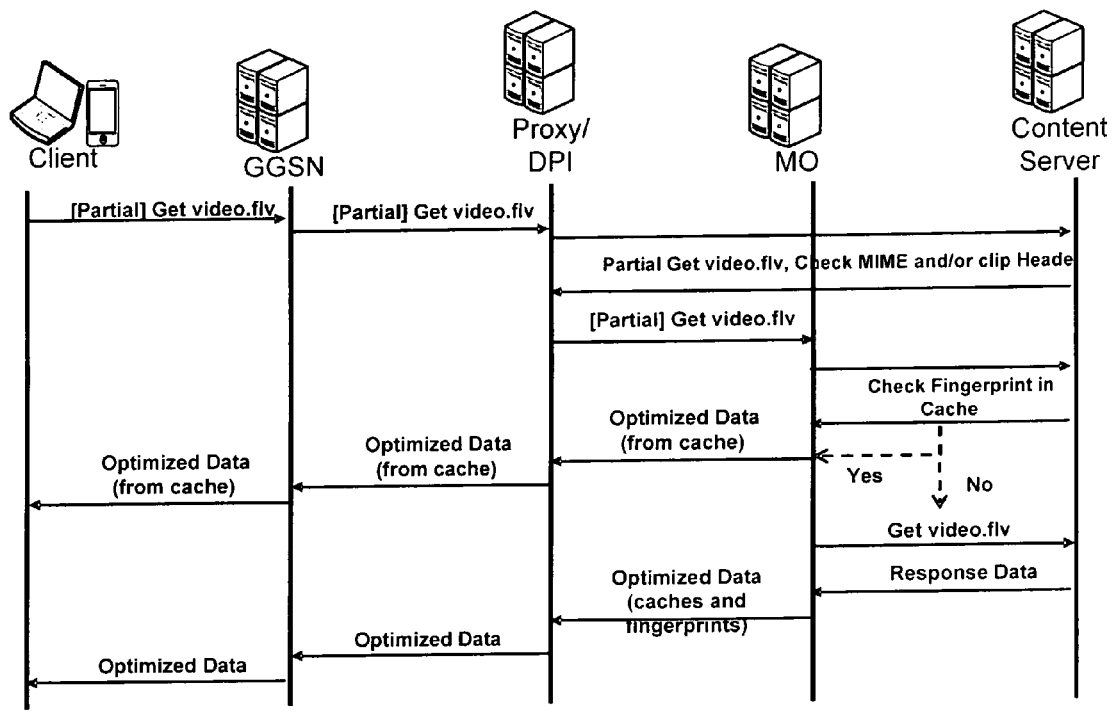
FIG. 14 illustrates a call flow of caching with fingerprints according to one embodiment of the invention.
Figure 15:
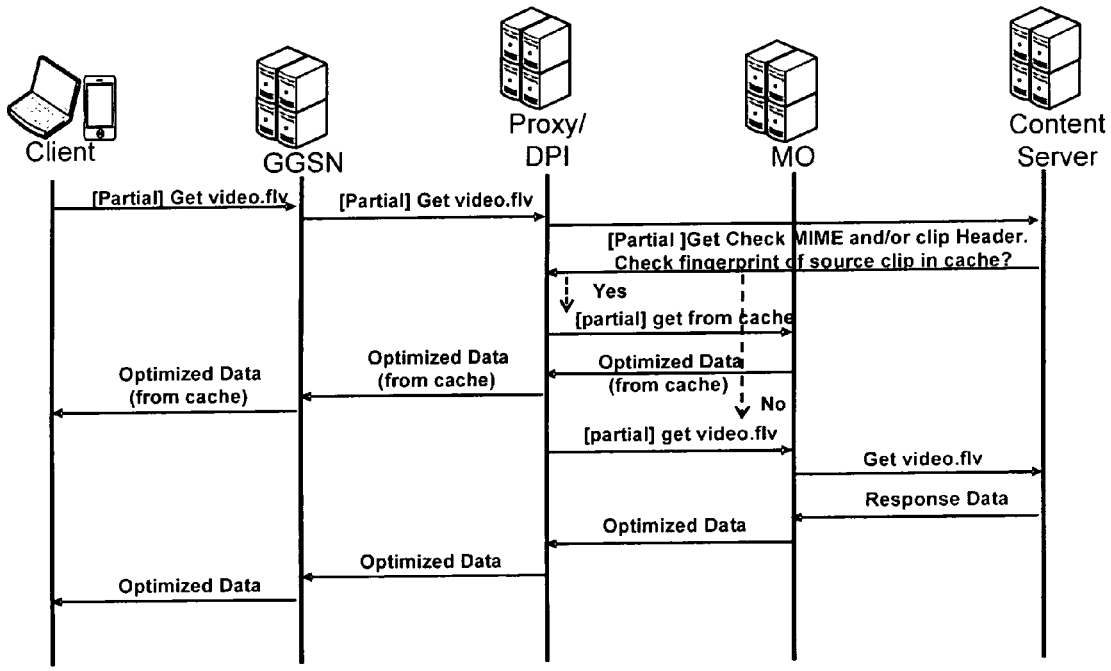
FIG. 15 illustrates a call flow of proxy-based smart fingerprinting according to one embodiment of the invention.

FIG. 14 and FIG. 15 illustrate the use of fingerprinting in accessing the content from cache or from the source. There are various ways where the cached fingerprints and content can be located. Two scenarios: where MO performs the caching/fingerprinting and where the proxy (SVP) performs that function. It is also possible that the fingerprinting is performed in the SVP, but the actual content caching be performed in the MO. In this case the SVP would request the content from the MO with a cache token, and the MO would serve the content from the cache if possible, this has the benefit that the SVP can direct requests to a MO system using the cache fingerprint as a reference, so improving the potential for a cache hit.

FIG. 14 illustrates a call flow of MO caching with fingerprints. FIG. 15 illustrates a proxy based fingerprinting technique.

Performing the fingerprinting in the SVP has the following advantages:

1) SVP would only touch the source server 2 times instead of 3 times (once by the proxy to check content type, then by MO to get the clip info, and finally by MO to grab the clip for optimization).

2) A further optimization is to have this proxy pull the content from the source and have MO pull the file from the proxy instead—this would reduce the number of requests on the source server to only one, and assuming the proxy and the MO are co-located, this would reduce the source access time. The SVP could also have its own front end cache (similar to a reverse proxy).

Dynamic Bit-rate Adaptation

Bandwidth variations are common in networks in general but are more severe in mobile and wireless networks due to propagation issues and fading etc. In today's 2G-3.5G networks, quality of service is rarely in place or enabled, and best effort approaches are used. Available bandwidth to a 3/3.5G user typically varies from 64 kbps to 300 kbps.

Dynamic bitrate adaptation (DBRA) is a general term used to describe the ability of a delivery system to adjust its transmitted bandwidth to match network fluctuations. Dynamic adaptation depends on a number of conditions such as the protocol employed end-to-end and the multiplicity of bitrates that will need to be supported for the range of bitrates encountered on the network.

End-to-end protocol in use. DBRA approaches are different for RTSP and HTTP progressive download (PD). In RTSP, there is a standardized approach that is increasingly being adopted by infrastructure providers and handset vendors. For the RTSP DBRA scheme to be of value, handset support and the support of RTSP streaming and relay servers is essential. For HTTP PD, there is no standardized way today to implement DBRA. Different terminals and media-player technologies implement different strategies.

Several terminals, like the iPhone OS 3.0, require that a multiplicity of bitrates be available in the content asset, and the decision of which one to select is left to the media player (the native media player of iPhone OS 3.0 implements this). Other streaming and media player technologies use different approaches. As HTTP PD is far more widely used than RTSP for video delivery today, and hence infrastructure has to support the dominant methods which ensure proper compatibility (for example proper interworking with HTTP proxy caches).

The RTSP approach is feedback-based (streaming system delivers higher/lower bitrate depending on receive reports from the handset, whereas HTTP-PD approaches today are either feedback based, or are open-loop (e.g. iPhone OS 3.0)).

Multiplicity of Bitrates. If the DBRA scheme is feedback based, the streaming system may use on-the-fly transrating to meet the reported network conditions, or may switch to an existing stream with an appropriate bitrate (pre-transrated or "already being encoded"). If the DBRA scheme is open loop, the delivery infrastructure has to produce each bitstream with a range of bitrates (e.g. 3-10) depending on deployment. Producing a multiplicity of bitrates (for RTSP or HTTP-PD) amounts to transcoding the bitstream at different target rates and is highly costly if it is done using a brute force approach.

Source Playlist Rewriting

Streaming protocols based on playlists (e.g. iPhone OS 3.0, Microsoft Smooth Streaming, etc) allow for the specification of multiple bit rate outputs and alternative streams/programs for dynamic bitrate adaptation. Such protocols do not require the handsets to signal its receiver conditions for bitrate adaptation by the servers (i.e. the protocols are not feedback based). Rather, the protocol expects the server to indicate in the playlist the bitrate of each alternative stream, and the client (media player) requests the stream with the bitrate that is most appropriate to maintain the smoothness of playback at a highest quality. Hence the client can "shift" the bitrate based on its playing conditions.

The client can determine the play condition because it buffers the stream it is receiving and it is aware of the time of each packet it receives.

In mobile access conditions, the playlist and the declared alternative bitrates may not be appropriate or possible. For example, there is no point in listing in the playlist to the mobile client bitrates that exceed the "business rules" of the service provider at the time of play, whether because of specific event like a sports match, or because of expected congestions at the time of the event. The service provider in this case would only want bitrates that are achievable exposed. The alternative bitrates in the playlist may have to be filtered and the playlist re-written in order to expose to the media client/player only the appropriate bitrate it has to choose from. This avoids abuse by the media players and the users of the availability of high bitrates that are simply not practical in the context of mobile access.

When the MO or proxy re-writes the manifest, it is guided by business rules or by some generic rules of typical mobile bitrates, or based on knowledge it may have accumulated during its operation. The business rules may be time- or location-based, event-based, user-based, subnet-based, subscription-based, etc. Generic rules may be based on knowledge of the network and its typical bitrates or traffic/congestions conditions. The feedback may be based on lower level transmission protocols (such as TCP/IP, MAC-media access control), or the various changes in requests that the MO may have access to and may be to determine the most appropriate bands of bitrates for the network.

The playlist re-writing may filter (exclude) some alternative bitrates available at the content origins, may change the association of the bandwidth label and playlist, and may add additional bitrates that could be most appropriate given the business rules, generic conditions and/or the feedback accumulated from the network. The resulting rewritten playlist may list alternative bitstreams that best match the network and the traffic levels the service provider wishes to maintain on its network.

If the playlist re-writing only filters (exclude some of) the existing alternative listings existing in playlist, then the MO does not need to generate new bitstreams and the operation could be performed entirely in a proxy (e.g. SVP). The resource requirements in this case would be lighter, and the scalability higher. If the playlist re-writing includes new alternative bitrates/streams not present at the content origins, then the MO may be required to generate, possibly on the fly, these bitstreams. The generation in this case may be similar to the other video optimization operation.

TCP "Open" Feedback

For video transfers that occur over a TCP connection, or another connection that provides similar feedback at a lower level than the media, media adaptation can be conducted at the server using that feedback.

Typically transport layer information is not used directly in the session or application layer, i.e. the media layer. A client receiving a media stream over TPC, e.g. an FLV over HTTP PD, might send application layer messages indicating that buffer issues such as buffer under runs have occurred or may be occurring. This is a client driven approach and requests can be made for the server to change streams or the client might simply pull a different stream from the server. However, the server is not using the large amount of information available both immediately and over time in the lower level feedback.

Figure 16:
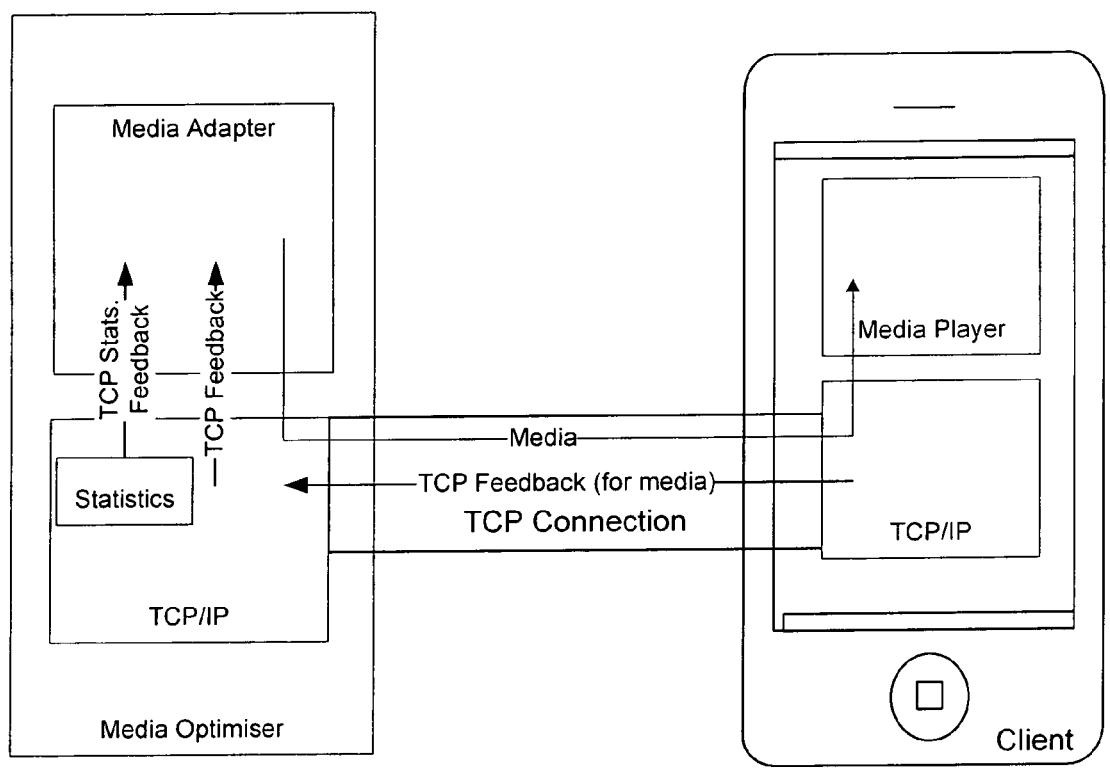
FIG. 16 illustrates the use of lower level feedback information and statistics in a media optimization path according to one embodiment of the invention.

To take advantage of this information a server driven "open" feedback adaption system can be used, the feedback information (and their statistics), such as cumulative acknowledgements and selective acknowledgements for lost packets, resends, window size, ECN as well as locally measured statistics in the protocol stack like buffer levels, transmission rates, can be used as an input to modify the media stream being prepared and transmitted. FIG. 16 illustrates the use of feedback information and statistics in a media optimization path.

The statistics may be used raw or be processed with a filter in order to be more meaningful, for example on a burst-prone network channel some low pass filtering may be beneficial in order to smooth out fluctuations, additionally or alternatively hysteresis may be put in the logic using such statistics.

This approach has significant advantages as the server can gradually adjust transmitted media in response to changes and avoid more drastic issues such as large buffering delays from occurring and degrading the viewing experience. It also allows for very fast response to certain types of occurrences that may eventually impact quality.

For example, by continually tracking the local data transmission rate and TCP window size, variations in receiver buffer capacity and network throughput can be determined. This can then be applied in a media optimization processing.

The information can also be used in several other ways to modify the transmitted content to be more suited to conditions. If significantly high retransmissions are occurring, the media producer might be instructed to produce more packets of a smaller size to increase throughput. Addition of forward error correction information might also be considered, particularly when in an application that is timely such as video playback (in this case the decoder might not be able to wait for a re-transmission and must conceal the packet loss instead of waiting for data arrival). In this way a client might be able to indicate it has received the data it has skipped via a cumulative acknowledgment and hence avoid additional network utilization on retransmitting data that it will not use.

Selective Seeking

Embodiments of the present invention provide for the selective seeking of content when delivering playlists of content as an HTTP progressive download object. This facility is especially useful for spliced content and in particular in Video Advertising.

A features of the Content Adapter is the ability to support streams (either real time or delivered as HTTP files/objects). This is advantageous to reduce session setup time for the playback of multiple clips, or to allow the embedding of advertisements in order to provide a revenue stream for the service.

Content consumers are accustomed to having an ability to 'seek' to different parts of a content, especially when the content is delivered using Progressive Download (PD) methods by moving a 'progress bar' in order to locate a later section of the video being played. When the service being deployed contains video advertising elements or other 'offi-cial' notices it is beneficial if the consumer cannot easily skip past these items into the content itself.

In order to provide this facility DCA provides a scheme where content playlists delivered as Progressive download can have the regions in which they are 'seekable' controlled by the delivery server.

In many existing services, the splicing of video advertisements is performed as an operation on the client. This is a potentially vulnerability for click fraud, or avoidance of watching the sponsoring advertisement.

The scheme is described as it applies to the 3GP progressive download format of which aspects are further described in U.S. patent application Ser. No. 12/554,473, filed Sep. 4, 2009 and entitled "METHOD AND APPARATUS FOR TRANSMITTING VIDEO". The technique could equally be applied to other delivery formats like RTSP and Adobe RTMP.

When the delivery of a seekable playlist of content is requested each item in the playlist, its duration and the seeking mode to be used for each clip can be defined.

The resultant output 'file' generated by the content adapter should have seek points defined in the 3GP header if all of the items defined in the playlist are already in its cache or readily accessible (and available for serving without further transcoding). If the items are not all present then the system can define the first frame of the file as seekable.

The 'seekpoints' defined should correspond with each of the items in the clip according to the 'seek mode' defined for each.

The seek mode options are:
  None—No seek points are defined for the clip.
  All—All of the I frames in the clip are marked as seekable points, including the first frame
  First—Only the first frame in each clip is marked as seekable (equivalent to 'chapters')
  SkipStart—All of the I-frames are marked as seekable points except for those in a defined initial period, N, for example in the first 10 seconds. This mode is especially useful for clips immediately following advertisements.

The 'skipstart' mode is beneficial as it allows a service provider to better ensure that ad clips are delivered to the client and cannot easily be skipped. This is because when the customer moves the 'progress' bar to a location in the file the player will normally jump to closest seek point which is earlier in the stream.

Figure 17:
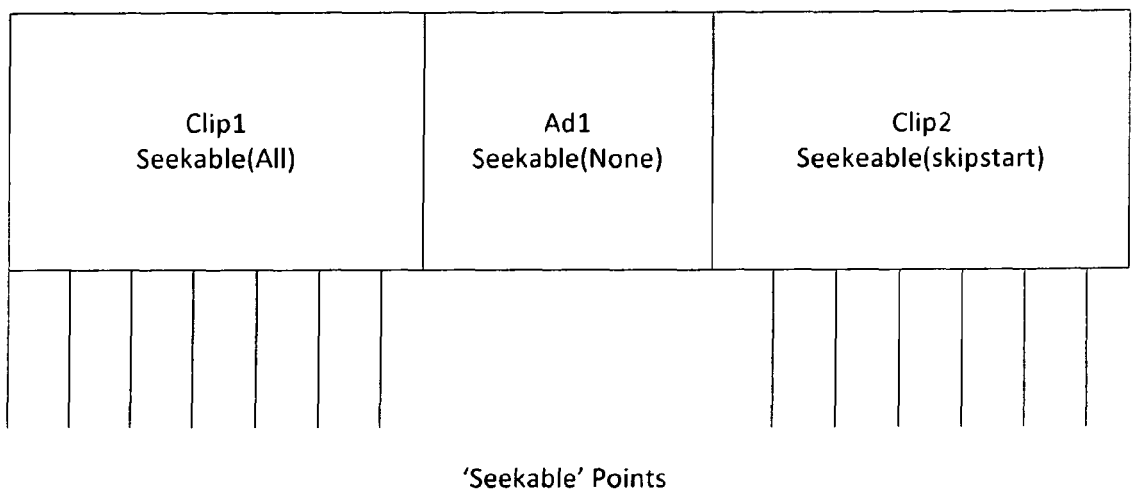
FIG. 17 illustrates seekable spliced content according to one embodiment of the invention.

FIG. 17 shows an interstitial ad spliced between two content items. The consumer would never be able to seek to the start of the second clip, and so in many cases would watch through the ad, but would retain the facility to seek back and forth within the content in order to maintain the capability already offered on many services.

The DCA also has the ability to resolve byte range requests to the individual items defined in the playlist, and identify the location within each clip to deliver content from.

Additionally, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of transmitting media to a client by an infrastructure device in a packet-switched network, the method comprising:
  receiving a request for media from the client at the infrastructure device;
  receiving a media stream at the infrastructure device;

determining in a strategy controller at the infrastructure device, an optimization strategy for adapting the received media stream for optimized network transmission to the client, the optimization strategy being determined according to at least one of one or more pieces of network information associated with network utilization of the packet-switched network, one or more pieces of client information associated with the client, one or more pieces of media information associated with the media stream, or one or more policies; and adapting the received media stream according to the determined optimization strategy to produce an output media stream, wherein adapting the received media stream results in a single adapted representation of content from the received media stream.

2. The method of claim 1 wherein determining an optimization strategy further comprises analyzing at least one of one or more feedback messages and one or more network messages.

3. The method of claim 2 wherein the one or more feedback messages or the one or more network messages are provided by at least one of:

one or more components of the packet-switched network, the one or more components being external to the infrastructure device; or one or more protocols between the client and the network infrastructure.

4. The method of claim 1 wherein determining an optimization strategy comprises reading one or more policies from a file or a database.

5. The method of claim 1 wherein determining an optimization strategy comprises determining one or more techniques for media bit-rate reduction.

6. The method of claim 1 further comprising modifying the optimization strategy upon receiving at least one of one or more additional pieces of network information associated with the packet-switched network or one or more additional pieces of client information associated with the client.

7. An apparatus for transmitting media to a client by an infrastructure device in a packet-switched network, the apparatus comprising:

a media optimization strategy module adapted to determine a media optimization strategy for adapting a received media stream for improved network transmission to a client;

a media adaptation module adapted to execute the media optimization strategy to adapt the received media stream to produce an output media stream, wherein adapting the received media stream results in a single adapted representation of content from the received media stream;

an input module coupled to the media adaptation module, the input module adapted to receive a media stream;

an output module coupled to the media adaptation module, the output module adapted to transmit the output media stream;

a network information analyzer module coupled to the media adaptation module, the network information analyzer module adapted to analyze one or more pieces of network information associated with network utilization of the packet switched network;

a client information analyzer module coupled to the media adaptation module, the client information analyzer module adapted to analyze one or more pieces of client information; and a policy module coupled to the media adaptation module.

8. The apparatus of claim 7 wherein the adaptation module is further adapted to receive an adaptation command from at least one of the network information analyzer module or client information analyzer module.

9. The apparatus of claim 7 wherein the policy module is coupled to a policy configuration interface.

10. An apparatus for transmitting media to a client by an infrastructure device in a packet-switched network, the apparatus comprising:

an input module adapted to receive a media stream;

a media optimization module coupled to the input module and adapted to execute a media adaptation process for adapting the received media stream for improved network transmission to the client, wherein adapting the received media stream results in a single adapted representation of content from the received media stream; and a proxy module coupled to the media optimization module, wherein the proxy module is adapted to receive a request from a client directed to a server external to the infrastructure device, and redirect one or more media elements of the request to the media optimization module.

11. The apparatus of claim 10 wherein the one or more media elements are a video file, wherein the video file is in a progressive download format.

12. The apparatus of claim 10 wherein one or more non-media elements are passed directly to the client from the server.

13. A method of modifying a media manifest to be delivered to a client by an infrastructure device in a packet-switched network, the method comprising:

receiving from a server, a media manifest comprising of two or more alternative encodings of a same media stream, wherein the two or more alternative encodings are created to be selectable at the client;

modifying the media manifest to produce a modified media manifest; and delivering the modified media manifest to the client.

14. The method of claim 13 wherein modifying the media manifest comprises removing one or more of the alternative media encodings.

15. The method of claim 13 wherein modifying the media manifest comprises adding one or more additional alternative media encodings not provided in the media manifest.

16. The method of claim 13 wherein each of the two or more alternative media encodings have a different video bitrate from each of the other two or more alternative media encodings.

17. The method of claim 13 wherein the manifest file is encoded for an iPhone OS3 client or a Microsoft Smooth Streaming client.

18. The method of claim 1 wherein the output media stream comprises a reduced bit rate as compared to the bit rate of the media stream.

19. The method of claim 1 further comprising transmitting the output media stream multiplexed in a container format.

20. The method of claim 1 further comprising transmitting the output media stream as a RTP stream.

* * * * *